(12) United States Patent
Shibai et al.

(10) Patent No.: US 10,996,377 B2
(45) Date of Patent: May 4, 2021

(54) METHOD FOR PRODUCING OPTICAL MEMBER AND OPTICAL MEMBER

(71) Applicant: SHARP KABUSHIKI KAISHA, Sakai (JP)

(72) Inventors: Yasuhiro Shibai, Sakai (JP); Ken Atsumo, Sakai (JP); Hidekazu Hayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 225 days.

(21) Appl. No.: 16/078,210

(22) PCT Filed: Feb. 15, 2017

(86) PCT No.: PCT/JP2017/005397
§ 371 (c)(1),
(2) Date: Aug. 21, 2018

(87) PCT Pub. No.: WO2017/145881
PCT Pub. Date: Aug. 31, 2017

(65) Prior Publication Data
US 2019/0041549 A1  Feb. 7, 2019

(30) Foreign Application Priority Data

Feb. 22, 2016  (JP) .............................. JP2016-031428

(51) Int. Cl.
*B32B 27/30*  (2006.01)
*G02B 1/118*  (2015.01)
(Continued)

(52) U.S. Cl.
CPC ................ *G02B 1/118* (2013.01); *B32B 3/30* (2013.01); *B32B 23/08* (2013.01); *B32B 27/00* (2013.01);
(Continued)

(58) Field of Classification Search
CPC .. G02B 1/14; G02B 1/118; G02B 1/18; B32B 3/30; B32B 27/00; B32B 27/30; B32B 27/308; B32B 27/08; B32B 23/08
See application file for complete search history.

(56) References Cited

U.S. PATENT DOCUMENTS

2014/0127463 A1  5/2014  Otani et al.
2015/0166704 A1*  6/2015  Otani ................... C08F 290/062
                                                                 359/601
2017/0066207 A1*  3/2017  Hayashi ................ B29C 59/026

FOREIGN PATENT DOCUMENTS

JP  2013-018910 A  1/2013
JP  2013-039711 A  2/2013
(Continued)

OTHER PUBLICATIONS

Translation to English of JP 2013018910 A via espacenet. accessed May 27, 2020 (Year: 2013).*

(Continued)

*Primary Examiner* — Mathieu D Vargot
(74) *Attorney, Agent, or Firm* — ScienBiziP, P.C.

(57) ABSTRACT

The method for producing an optical member of the present invention includes: a step (1) of applying a lower layer resin and an upper layer resin; a step (2) of pressing a die against the lower layer resin and the upper layer resin from the upper layer resin side, so as to form a resin layer including an uneven structure on a surface thereof; and a step (3) of curing the resin layer to form the polymer layer, wherein the lower layer resin contains an amide group, the lower layer resin has an amide group concentration of 1.5 mmol/g or more and less than 5 mmol/g, and the polymer layer has a minimum storage modulus E' of $1 \times 10^8$ Pa or higher and $1 \times 10^9$ Pa or lower at a bottom temperature of 110° C. or higher and 210° C. or lower.

17 Claims, 9 Drawing Sheets

(51) Int. Cl.
  *B32B 3/30*      (2006.01)
  *B32B 27/00*     (2006.01)
  *B32B 23/08*     (2006.01)
  B32B 27/16       (2006.01)
  B32B 27/22       (2006.01)
(52) U.S. Cl.
  CPC ............ *B32B 27/30* (2013.01); *B32B 27/308* (2013.01); *B32B 27/16* (2013.01); *B32B 27/22* (2013.01)

(56) References Cited

FOREIGN PATENT DOCUMENTS

| JP | 2013-252689 A | 12/2013 |
| WO | 2013/005769 A1 | 1/2013 |

OTHER PUBLICATIONS

Translation to English of JP2013039711 A via espacenet. accessed May 27, 2020 (Year: 2013).*

* cited by examiner (a)

(b)

(c)

(d)

(a)       (b)       (c)

(a)

(b)

(c)

(d)

(e)

(a)

(b)

(c)

(d)

Fig. 8-1
(a)
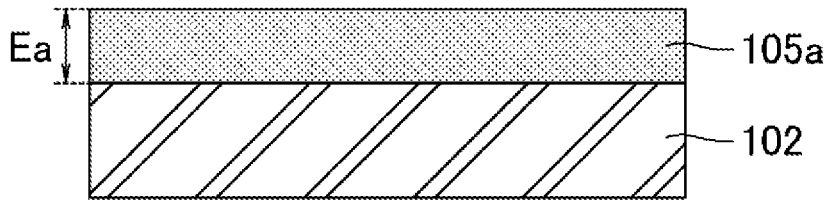
(b)
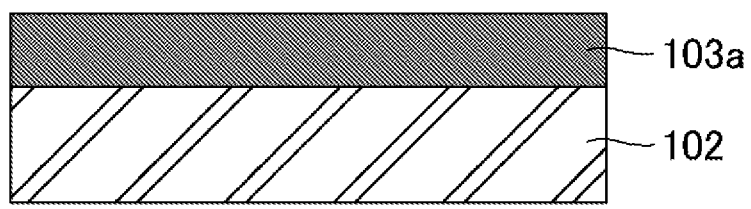
(c)
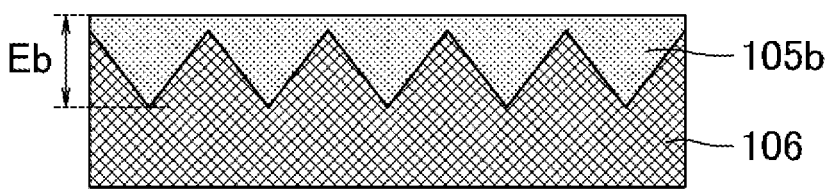
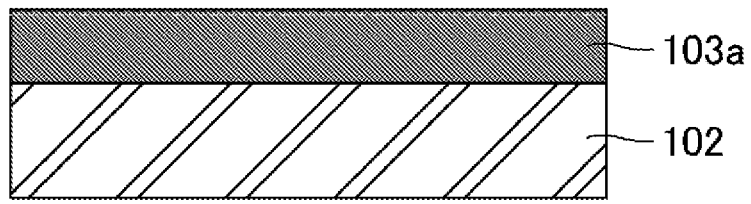
(d)
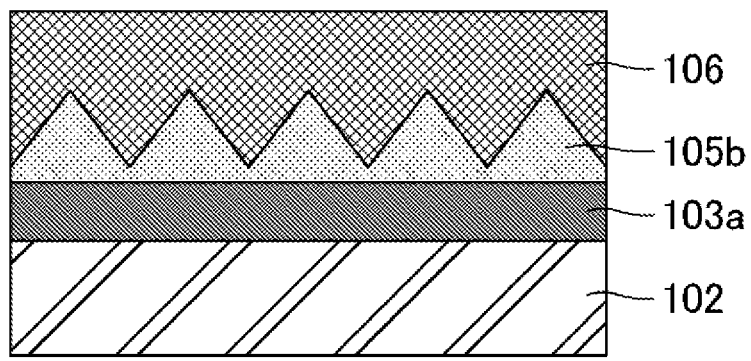

(e)

(f)

(a)

(b)

(c)

(d)

METHOD FOR PRODUCING OPTICAL MEMBER AND OPTICAL MEMBER

TECHNICAL FIELD

The present invention relates to a method for producing an optical member, and an optical member. More specifically, the present invention relates to a method for producing an optical member including a nanometer-sized uneven structure, and an optical member.

BACKGROUND ART

Various optical members having antireflective properties have been studied (for example, Patent Literatures 1 to 4). In particular, optical members including a nanometer-sized uneven structure (nanostructure) are known for their excellent antireflective properties. This uneven structure has a continuously varying refractive index from the air layer to the substrate, thereby capable of reducing the reflected light significantly.

CITATION LIST

Patent Literature

Patent Literature 1: WO 2013/005769
Patent Literature 2: JP 2013-18910 A
Patent Literature 3: JP 2013-252689 A
Patent Literature 4: JP 2013-39711 A

SUMMARY OF INVENTION

Technical Problem

Examples of such optical members include arrangements in which a polymer layer including an uneven structure is disposed on a substrate. The present inventors have made studies and have found that a polymer layer containing an amide group has high hydrogen-bonding strength and thus exhibits high adhesion to a substrate (in particular, a highly polar, non-surface-treated substrate). Also, since amide groups (amide bonds) have high cohesion therebetween, the surface of the polymer layer opposite to the substrate was found to be less likely to have scratch marks even when rubbed with a hard product such as steel wool.

The studies made by the present inventors, however, revealed that too large an amount of amide group causes the polymer layer to be hard and less elastic. Such a polymer layer has a problem that when its surface opposite to the substrate is rubbed with a soft material such as nonwoven fabric, projections (protrusions) fallen by the rubbing fail to rise (restore) again, so that the optical member appears white. In other words, the polymer layer unfortunately has poor rubbing resistance. It was found that particularly at high temperature and high humidity, the smoothness of the surface of the polymer layer is reduced due to factors such as moisture, resulting in not only a significant reduction in rubbing resistance but also a reduction in adhesion between the substrate and the polymer layer.

Conventional optical members, as described above, have a problem in achieving both adhesion between the substrate and the polymer layer and rubbing resistance at high temperature and high humidity. Yet, any solution to the problem has not been found.

For example, Patent Literature 1 discloses that a substrate containing triacetyl cellulose and a cured product of an active-energy-ray-curable resin composition having a micro uneven structure are tightly bonded to each other. Patent Literature 1, however, includes no statements relating to a decrease in rubbing resistance, failing to solve the above problem. The inventions disclosed in Patent Literatures 2 to 4 also failed to solve the above problem.

The present invention was made in view of the current state of the art described above, and aims to provide a method for producing an optical member and an optical member capable of achieving both adhesion between the substrate and the polymer layer and rubbing resistance at high temperature and high humidity.

Solution to Problem

The present inventors made various studies on a method for producing an optical member capable of achieving both adhesion between the substrate and the polymer layer and rubbing resistance at high temperature and high humidity. They focused on a method including: applying a lower layer resin and an upper layer resin; in a state where these two layers are sequentially stacked from the substrate side, pressing a die against the two layers to form a resin layer including on a surface thereof a nanometer-sized uneven structure; and then curing the resin layer to form a polymer layer. The present inventors found that when the lower layer resin contains an amide group at a predetermined concentration, and the polymer layer has a minimum storage modulus of a predetermined range at a bottom temperature of a predetermined range, it is possible to produce an optical member capable of achieving both adhesion between the substrate and the polymer layer and rubbing resistance at high temperature and high humidity. Thus, the present inventors successfully solved the above problem and accomplished the present invention.

Specifically, according to one aspect, the present invention may provide a method for producing an optical member including a substrate and a polymer layer that is in direct contact with the substrate and that includes on a surface thereof an uneven structure provided with multiple projections at a pitch not longer than a wavelength of visible light, the method including: a step (1) of applying a lower layer resin and an upper layer resin; a step (2) of pressing a die against the lower layer resin and the upper layer resin from the upper layer resin side in a state where the lower layer resin and the upper layer resin applied are sequentially stacked from the substrate side, so as to form a resin layer including the uneven structure on a surface thereof; and a step (3) of curing the resin layer to form the polymer layer, wherein the lower layer resin contains an amide group, the lower layer resin has an amide group concentration of 1.5 mmol/g or more and less than 5 mmol/g, and the polymer layer has a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

According to another aspect, the present invention may provide an optical member including: a substrate; and a polymer layer that is in direct contact with the substrate and that includes on a surface thereof an uneven structure provided with multiple projections at a pitch not longer than a wavelength of visible light, wherein the polymer layer is a cured product of a resin layer that includes the uneven structure on a surface thereof and that is formed by pressing a die against a lower layer resin having an amide group concentration of 1.5 mmol/g or more and less than 5 mmol/g and an upper layer resin from the upper layer resin side in a state where the lower layer resin and the upper layer resin are sequentially stacked from the substrate side, and the polymer layer has a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

Advantageous Effects of Invention

According to the present invention, it is possible to provide a method for producing an optical member and an optical member capable of achieving both adhesion between the substrate and the polymer layer and rubbing resistance at high temperature and high humidity.

BRIEF DESCRIPTION OF DRAWINGS

FIG. 3(a) shows the case where the bottom temperature and the minimum storage modulus E' fall within the respective appropriate ranges, FIG. 3(b) shows the case where the minimum storage modulus E' is less than that in the case of FIG. 3(a), and FIG. 3(c) shows the case where at least one of the bottom temperature and the minimum storage modulus E' is higher than the corresponding value in the case of FIG. 3(a).

FIG. 8-1 shows schematic cross-sectional views illustrating a production process of an optical member of Comparative Example 16 (steps a to d).

FIG. 8-2 shows schematic cross-sectional views illustrating the production process of the optical member of Comparative Example 16 (steps e to f).

DESCRIPTION OF EMBODIMENTS

Hereinafter, the present invention is described in more detail based on embodiments with reference to the drawings. These embodiments, however, are not intended to limit the scope of the present invention. The features of the embodiment may appropriately be combined or modified within the spirit of the present invention.

Embodiment 1

Figure 1:
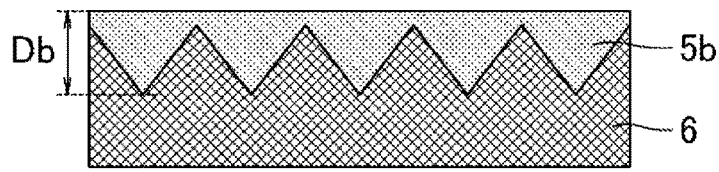
FIG. 1 shows schematic cross-sectional views illustrating a production process of an optical member of Embodiment 1 (steps a to d).
Figure 1:
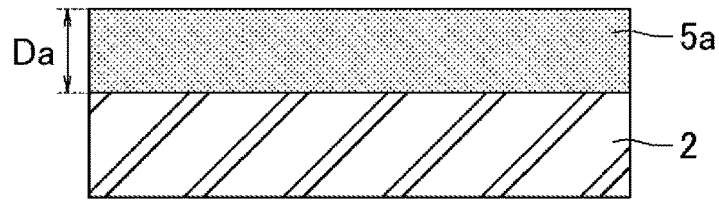
Figure 1:
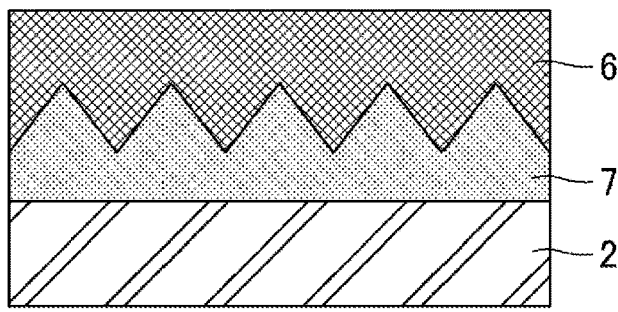
Figure 1:
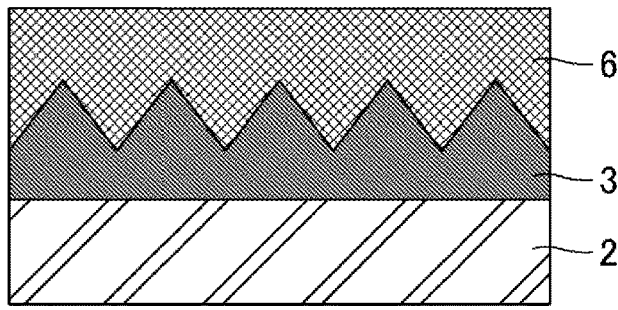
Figure 1:
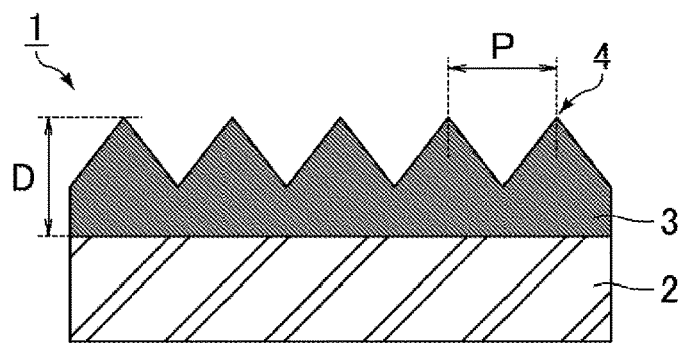

A method for producing an optical member of Embodiment 1 is described below with reference to FIG. 1. FIG. 1 shows schematic cross-sectional views illustrating a production process of an optical member of Embodiment 1 (steps a to d).

(a) Application of Lower Layer Resin and Upper Layer Resin

First, as shown in FIG. 1(a), a lower layer resin 5a is applied to a substrate 2. As a result, the lower layer resin 5a is formed in direct contact with the substrate 2. Meanwhile, an upper layer resin 5b is applied to an irregular surface of a die 6.

The lower layer resin 5a and the upper layer resin 5b may be applied by any technique such as spray coating, gravure coating, or slot-die coating. Application by spray coating is preferred because the film thickness can be easily adjusted and the equipment cost can be reduced. It is particularly preferred to use a swirl nozzle, electrostatic nozzle, or ultrasonic nozzle for application.

(b) Formation of Uneven Structure

As shown in FIG. 1(b), the die 6 to which the upper layer resin 5b is applied is pressed against the lower layer resin 5a applied to the substrate 2 from the upper layer resin 5b side, whereby the upper layer resin 5b is stacked on the lower layer resin 5a and an uneven structure is formed simultaneously. As a result, a resin layer 7 including the uneven structure on its surface opposite to the substrate 2 is formed. The resin layer 7 is formed from the lower layer resin 5a and the upper layer resin 5b that are integrated with each other without an interface therebetween.

(c) Curing of Resin Layer

The resin layer 7 including the uneven structure formed thereon is cured (polymerized). As a result, a polymer layer 3 as shown in FIG. 1(c) is formed.

The resin layer 7 is preferably cured by application of active energy rays. Herein, the active energy rays mean ultraviolet rays, visible light, infrared rays, or plasma, for example. The resin layer 7 is preferably cured by ultraviolet rays. Active energy rays may be applied from the substrate 2 side or the resin layer 7 side. The number of times to apply active energy rays to the resin layer 7 is not particularly limited, and may be one or more than one.

(d) Release of Die

The die 6 is released from the polymer layer 3. As a result, an optical member 1 as shown in FIG. 1(d) is completed.

The uneven structure formed on the surface of the polymer layer 3 opposite to the substrate 2 corresponds to a structure provided with multiple projections 4 at a pitch (distance between the apexes of adjacent projections 4) P not longer than a wavelength of visible light, i.e., the moth-eye structure. The optical member 1 therefore corresponds to an antireflective member having on a surface thereof a moth-eye structure. Thus, the optical member 1 can exert excellent antireflective properties (low reflectivity) owing to the moth-eye structure.

In the production process described above, the steps (a) to (d) can be performed in a continuous, efficient manner with, for example, the substrate 2 having a roll shape.

Subsequently, members used to produce the optical member 1 are described below.

The substrate 2 may be formed of any material such as triacetyl cellulose (TAC), polyethylene terephthalate (PET), or methyl methacrylate (MMA). In this embodiment, as described later, the lower layer resin 5a contains an amide group. In other words, the polymer layer 3 contains an amide group, so that the adhesion between the substrate 2 and the polymer layer 3 is high at high temperature and high humidity even if the substrate 2 contains triacetyl cellulose which has high polarity. More specifically, the adhesion between the substrate 2 and the polymer layer 3 is high at high temperature and high humidity even if the substrate 2 contains triacetyl cellulose at least on the surface thereof adjacent to the polymer layer 3 (the lower layer resin 5*a*). Triacetyl cellulose as used herein refers to cellulose acetate having a degree of acetylation of 58% or higher, preferably cellulose acetate having a degree of acetylation of 61% or higher. The substrate 2 may appropriately contain additives such as a plasticizer as appropriate, in addition to the above materials.

The surface of the substrate 2 adjacent to the polymer layer 3 (the lower layer resin 5*a*) may not have been subjected to surface treatment or may have been subjected to surface treatment such as cleaning treatment. Meanwhile, since the substrate 2 and the polymer layer 3 (the lower layer resin 5*a*) are in direct contact with each other, there is no layer formed by surface treatment (e.g., a primer layer formed by primer treatment) on the surface of the substrate 2 adjacent to the polymer layer 3 (the lower layer resin 5*a*).

The substrate 2 may have any shape such as a film shape or a sheet shape. In the case of forming the optical member 1 into a film shape, the film-shaped substrate 2 may be used. For example, a film such as a triacetyl cellulose film (TAC film) is preferred. Also, the substrate 2 preferably constitutes a part of a polarizing plate.

The substrate 2 may have any thickness. In order to ensure the transparency and processability, the thickness is preferably 50 μm or more and 100 μm or less.

The lower layer resin 5*a* contains an amide group. The lower layer resin 5*a* has an amide group concentration of 1.5 mmol/g or more and less than 5 mmol/g. The polymer layer 3 in which the lower layer resin 5*a* has an amide group concentration of less than 1.5 mmol/g contains too small an amount of the amide group on the surface adjacent to the substrate 2, so that the adhesion between the substrate 2 and the polymer layer 3 will be reduced particularly at high temperature and high humidity. The polymer layer 3 in which the lower layer resin 5*a* has an amide group concentration of 5 mmol/g or more has a low crosslinking density and a very strong cohesive force between bonds, thus exhibiting high hardness and low rubbing resistance at high temperature and high humidity. In order to sufficiently increase the adhesion between the substrate 2 and the polymer layer 3 and the rubbing resistance at high temperature and high humidity, the lower layer resin 5*a* preferably has an amide group concentration of 2 mmol/g or more and less than 4.5 mmol/g, more preferably 2.5 mmol/g or more and less than 4 mmol/g.

Increasing the amide group concentration in the polymer layer 3 can increase the adhesion between the substrate 2 and the polymer layer 3. In this respect, according to the method for forming the polymer layer 3 from the lower layer resin 5*a* and the upper layer resin 5*b* as in this embodiment, it is possible to efficiently increase the amount of the amide group on the surface of the polymer layer 3 adjacent to the substrate 2, owing to the presence of the amide group in the lower layer resin 5*a*. Thus, the rubbing resistance can be increased without impairing the adhesion between the substrate 2 and the polymer layer 3 at high temperature and high humidity even if the amide group concentration is low as compared to the case where the polymer layer 3 is formed from a single layer resin (e.g., only the lower layer resin 5*a*).

The lower layer resin 5*a* and the upper layer resin 5*b* may each appropriately contain a compound such as a monofunctional amide monomer, a polyfunctional acrylate, a monofunctional acrylate, and a fluorine-containing compound. The amide group in the lower layer resin 5*a* is preferably one derived from a monofunctional amide monomer.

Examples of the monofunctional amide monomer include N-acryloylmorpholine, N,N-dimethylacrylamide, N,N-diethylacrylamide, N-vinyl-2-pyrrolidone, N,N-dimethylmethacrylamide, and N-methoxy-N-methyl-3-phenyl-acrylamide. Known examples of N-acryloylmorpholine include a monofunctional amide monomer (trade name: ACMO®) from KJ Chemicals Corp. Known examples of N,N-dimethylacrylamide include a monofunctional amide monomer (trade name: DMAA®) from KJ Chemicals Corp. Known examples of N,N-diethylacrylamide include a monofunctional amide monomer (trade name: DEAA®) from KJ Chemicals Corp. Known examples of N-vinyl-2-pyrrolidone include a monofunctional amide monomer (trade name: N-vinylpyrrolidone) fromNippon Shokubai Co., Ltd. Known examples of N,N-dimethylmethacrylamide include a monofunctional amide monomer (product code: D0745) from Tokyo Chemical Industry Co., Ltd. Known examples of N-methoxy-N-methyl-3-phenyl-acrylamide include a monofunctional amide monomer from Sigma-Aldrich. The lower layer resin 5*a* and the upper layer resin 5*b* may each contain one or multiple monofunctional amide monomers.

Examples of the polyfunctional acrylate include urethane acrylate, ethoxylated pentaerythritol tetraacrylate, pentaerythritol triacrylate, 1,9-nonanediol diacrylate, dipentaerythritol hexaacrylate, a mixture of tripentaerythritol acrylate, mono- and di-pentaerythritol acrylates, and a polypentaerythritol acrylate, ethoxylated polyglycerin polyacrylate, trimethylolpropane triacrylate, alkoxylated dipentaerythritol polyacrylate, polyethylene glycol (200) diacrylate, polyethylene glycol (300) diacrylate, polyethylene glycol (400) diacrylate, polyethylene glycol (600) diacrylate, hexafunctional polyester acrylate, ethoxylated glycerin triacrylate, 1,6-hexanediol diacrylate, tripropylene glycol diacrylate, ethoxylated (4-mol adduct of) bisphenol A diacrylate, and dipropylene glycol diacrylate. Known examples of urethane acrylate include a polyfunctional acrylate (trade name: UA-306H) from Kyoeisha Chemical Co., Ltd. and a polyfunctional acrylate (trade name: U-10PA) from Shin Nakamura Chemical Co., Ltd. Known examples of ethoxylated pentaerythritol tetraacrylate include a polyfunctional acrylate (trade name: ATM-35E) from Shin Nakamura Chemical Co., Ltd. Known examples of pentaerythritol triacrylate include a polyfunctional acrylate (trade name: A-TMM-3LM-N) from Shin Nakamura Chemical Co., Ltd., a polyfunctional acrylate (trade name: A-TMM-3L) from Shin Nakamura Chemical Co., Ltd., and a polyfunctional acrylate (trade name: PET-3) from DKS Co. Ltd. Known examples of 1,9-nonanediol diacrylate include a polyfunctional acrylate (trade name: A-NOD-N) from Shin Nakamura Chemical Co., Ltd. Known examples of dipentaerythritol hexaacrylate include a polyfunctional acrylate (trade name: Light Acrylate DPE-6A) from Kyoeisha Chemical Co., Ltd. and a polyfunctional acrylate (trade name: A-DPH) from Shin Nakamura Chemical Co., Ltd. Examples of the mixture of tripentaerythritol acrylate, mono- and di-pentaerythritol acrylates, and polypentaerythritol acrylate include a polyfunctional acrylate (trade name: Viscoat#802) from Osaka Organic Chemical Industry Ltd. Examples of ethoxylated polyglycerin polyacrylate include a polyfunctional acrylate (trade name: NK ECONOMER® A-PG5027E) from Shin Nakamura Chemical Co., Ltd. Known examples of trimethylolpropane triacrylate include a polyfunctional acrylate (trade name: Light Acrylate TMP-A) from Kyoeisha Chemical Co., Ltd. Known examples of alkoxylated dipentaerythritol polyacrylate include a polyfunctional acrylate (trade name: KAYARAD® DPEA-12) from Nippon Kayaku Co., Ltd. and a polyfunctional acrylate (trade name: KAYARAD DPCA-30) from Nippon Kayaku Co., Ltd. Known examples of polyethylene glycol (200) diacrylate include a polyfunctional acrylate (trade name: PE-200) from DKS Co. Ltd. Known examples of polyethylene glycol (300) diacrylate include a polyfunctional acrylate (trade name: PE-300) from DKS Co. Ltd. Known examples of polyethylene glycol (400) diacrylate include a polyfunctional acrylate (trade name: A-400) from Shin Nakamura Chemical Co., Ltd. Known examples of polyethylene glycol (600) diacrylate include a polyfunctional acrylate (trade name: A-600) from Shin Nakamura Chemical Co., Ltd. Known examples of hexafunctional polyester acrylate include a polyfunctional acrylate (trade name: EBECRYL® 450) from Daicel-Allnex Ltd. Known examples of ethoxylated glycerin triacrylate include a polyfunctional acrylate (trade name: A-GLY-9E) from Shin Nakamura Chemical Co., Ltd. Known examples of 1,6-hexanediol diacrylate include a polyfunctional acrylate (trade name: A-HD-N) from Shin Nakamura Chemical Co., Ltd. Known examples of tripropylene glycol diacrylate include a polyfunctional acrylate (trade name: APG-200) from Shin Nakamura Chemical Co., Ltd. Known examples of ethoxylated (4-mol adduct of) bisphenol A diacrylate include a polyfunctional acrylate (trade name: A-BPE-4) from Shin Nakamura Chemical Co., Ltd. Known examples of dipropylene glycol diacrylate include a polyfunctional acrylate (trade name: APG-100) from Shin Nakamura Chemical Co., Ltd. The lower layer resin 5a and the upper layer resin 5b may each contain one or multiple polyfunctional acrylates.

Examples of the monofunctional acrylate include polypropylene glycol monoacrylate, 2-hydroxyethyl methacrylate, and 4-hydroxybutyl acrylate. Known examples of polypropylene glycol monoacrylate include a monofunctional acrylate (trade name: AP-550) from NOF Corporation. Known examples of 2-hydroxyethyl methacrylate include a monofunctional acrylate (trade name: 2HEMA) from Nippon Shokubai Co., Ltd. Known examples of 4-hydroxybutyl acrylate include a monofunctional acrylate (trade name: 4HBA) from Nihon Kasei Co., Ltd. The lower layer resin 5a and the upper layer resin 5b may each contain one or multiple monofunctional acrylates.

The fluorine-containing compound contains a fluorine-containing monomer as a constituent component. The fluorine-containing compound may further contain other monomer component(s) such as an acrylate monomer.

The fluorine-containing compound preferably contains a reactive group. The reactive group as used herein means a moiety reactive with another component under external energy such as light or heat. Examples of such a reactive group include an alkoxysilyl group, silyl ether group, silanol group obtained by hydrolysis of an alkoxysilyl group, carboxyl group, hydroxy group, epoxy group, vinyl group, allyl group, acryloyl group, and methacryloyl group. In terms of reactivity and handleability, the reactive group is preferably an alkoxysilyl, silyl ether, silanol, epoxy, vinyl, allyl, acryloyl, or methacryloyl group, more preferably a vinyl, allyl, acryloyl, or methacryloyl group, still more preferably an acryloyl or methacryloyl group.

The fluorine-containing compound preferably contains, in addition to a reactive group, a moiety containing at least one selected from the group consisting of fluoroalkyl groups, fluorooxyalkyl groups, fluoroalkenyl groups, fluoroalkanediyl groups, and fluorooxyalkanediyl groups. Fluoroalkyl groups, fluorooxyalkyl groups, fluoroalkenyl groups, fluoroalkanediyl groups, and fluorooxyalkanediyl groups are substituents in which at least one of the hydrogen atoms is replaced by a fluorine atom respectively in alkyl groups, oxyalkyl groups, alkenyl groups, alkanediyl groups, and oxyalkanediyl groups. Fluoroalkyl groups, fluorooxyalkyl groups, fluoroalkenyl groups, fluoroalkanediyl groups, and fluorooxyalkanediyl groups are substituents mainly containing fluorine atoms and carbon atoms. The structure of each group may have a branch, and multiple of these substituents may be linked with each other.

An example of the fluorine-containing monomer, which is a constituent component of the fluorine-containing compound, is one represented by the following formula (A):

$$R^{f1}-R^2-D^1 \quad (A)$$

wherein $R^{f1}$ is a moiety containing at least one selected from the group consisting of fluoroalkyl groups, fluorooxyalkyl groups, fluoroalkenyl groups, fluoroalkanediyl groups, and fluorooxyalkanediyl groups; $R^2$ is an alkanediyl group, an alkanetriyl group, or an ester, urethane, ether, or triazine structure derived therefrom; and $D^1$ is a reactive group.

Examples of the fluorine-containing monomer represented by the formula (A) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxybutyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutylethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecylethyl methacrylate, 2-perfluoro-3-methylbutylethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, dodecafluoroheptyl methacrylate, hexadecafluorononyl methacrylate, 1-trifluoromethyltrifluoroethyl methacrylate, hexafluorobutyl methacrylate, and triacryloyl-heptadecafluorononenyl-pentaerythritol.

An example of a material of the fluorine-containing monomer is preferably a material having a fluoropolyether moiety. The fluoropolyether moiety is a moiety containing groups such as a fluoroalkyl group, an oxyfluoroalkyl group, or an oxyfluoroalkyldiyl group, and is a structure typified by the following formula (B) or (C):

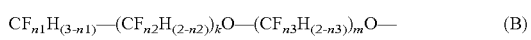

$$CF_{n1}H_{(3-n1)}-(CF_{n2}H_{(2-n2)})_k O-(CF_{n3}H_{(2-n3)})_m O- \quad (B)$$

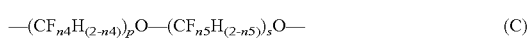

$$-(CF_{n4}H_{(2-n4)})_p O-(CF_{n5}H_{(2-n5)})_s O- \quad (C)$$

wherein n1 is an integer of 1 to 3; n2 to n5 are each 1 or 2; and k, m, p, and s are each an integer of 0 or greater. In a preferred combination of n1 to n5, n1 is 2 or 3 and n2 to n5 are each 1 or 2. In a more preferred combination, n1 is 3, n2 and n4 are each 2, and n3 and n5 are each 1 or 2.

The fluoropolyether moiety preferably has a carbon number of 4 or more and 12 or less, more preferably 4 or more and 10 or less, still more preferably 6 or more and 8 or less. If the carbon number is less than 4, the surface energy may unfortunately be low. If the carbon number is more than 12, the solubility in a solvent may unfortunately be low. The fluorine-containing monomer may contain multiple fluoropolyether moieties per molecule.

Known examples of the fluorine-containing compound include a fluorine-based additive (trade name: Optool® DAC-HP) from Daikin Industries, Ltd., a fluorine-based additive (trade name: Afluid) from Asahi Glass Co., Ltd., a fluorine-based additive (trade name: Megaface® RS-76-NS) from DIC Corp., a fluorine-based additive (trade name: Megaface RS-90) from DIC Corp., a fluorine-based additive (trade name: Ftergent® 601AD) from Neos Co., Ltd., a fluorine-based additive (trade name: Ftergent 650A) from Neos Co., Ltd., a fluorine-based additive (trade name: C10GACRY) from Yushiseihin Co., Ltd., and a fluorine-based additive (trade name: C8HGOL) from Yushiseihin Co., Ltd. The fluorine-containing compound is preferably one that is polymerizable by ultraviolet rays. The fluorine-containing compound preferably contains one or both of the —OCF$_2$— chain and the =NCO— chain. The lower layer resin 5$a$ and the upper layer resin 5$b$ may each contain one or multiple fluorine-containing compounds.

Preferably, the lower layer resin 5$a$ contains a monofunctional amide monomer, the amount of the monofunctional amide monomer in the lower layer resin 5$a$ is 15 wt % or more and 49 wt % or less. If the amount of the monofunctional amide monomer in the lower layer resin 5$a$ is less than 15 wt %, the amount of the amide group on the surface of the polymer layer 3 adjacent to the substrate 2 will be small. Thus, the adhesion between the substrate 2 and the polymer layer 3 may decrease particularly at high temperature and high humidity. If the amount of the monofunctional amide monomer in the lower layer resin 5$a$ is more than 49 wt %, the polymer layer 3 will have a low crosslinking density and a very strong cohesive force between bonds. Thus, the polymer layer 3 may have high hardness and low rubbing resistance at high temperature and high humidity. The amount of the monofunctional amide monomer in the lower layer resin 5$a$ is more preferably 20 wt % or more and 45 wt % or less, still more preferably 20 wt % or more and 40 wt % or less.

Owing to the presence of the monofunctional amide monomer in the lower layer resin 5$a$, the lower layer resin 5$a$ containing an amide group can be easily obtained. In this case, the monofunctional amide monomer preferably contains at least one of N,N-dimethylacrylamide and N,N-diethylacrylamide. N,N-dimethylacrylamide and N,N-diethylacrylamide have a high molecular weight and a low glass transition temperature among monofunctional amide monomers, and therefore can, even in a small amount, favorably increase the adhesion between the substrate 2 and the polymer layer 3 and the rubbing resistance at high temperature and high humidity.

Preferably, the upper layer resin 5$b$ contains a fluorine-containing compound, and the amount of the fluorine-containing compound in the upper layer resin 5$b$ is 0.1 wt % or more and 30 wt % or less. If the amount of the fluorine-containing compound in the upper layer resin 5$b$ is less than 0.1 wt %, the smoothness of the surface of the polymer layer 3 opposite to the substrate 2 may be low. In this case, the load on the projections 4 upon rubbing of the surface may be large, so that the optical member 1 may appear white. If the amount of the fluorine-containing compound in the upper layer resin 5$b$ is more than 30 wt %, the upper layer resin 5$b$ will have higher viscosity and the difference in solubility parameter (SP value) between the upper layer resin 5$b$ and the lower layer resin 5$a$ will increase. Thus, the lower layer resin 5$a$ and the upper layer resin 5$b$ will not be easily mixed with each other, and the adhesion therebetween may decrease. The amount of the fluorine-containing compound in the upper layer resin 5$b$ is preferably 5 wt % or more and 25 wt % or less, more preferably 10 wt % or more and 20 wt % or less. If the upper layer resin 5$b$ contains one or more fluorine-containing compounds, the sum of the amounts of the fluorine-containing compounds preferably falls within the above range.

Owing to the presence of the fluorine-containing compound in the upper layer resin 5$b$, the fluorine atoms can be more efficiently distributed on the surface of the polymer layer 3 opposite to the substrate 2. This increases the smoothness of the surface of the polymer layer 3 opposite to the substrate 2, enabling a reduction in load on the projections 4 upon rubbing of the surface. In addition, since the hygroscopicity of the polymer layer 3 decreases, particularly, the adhesion between the substrate 2 and the polymer layer 3 can be prevented from decreasing at high temperature and high humidity. Also, even if the amount of the monofunctional amide monomer is large and the polarity is thus very high, the adhesion between the substrate 2 and the polymer layer 3 can be prevented from decreasing at high temperature and high humidity. In contrast, if the lower layer resin 5$a$ contains a fluorine-containing compound and the amount thereof is too large, many fluorine atoms may be distributed on the surface of the polymer layer 3 adjacent to the substrate 2. Thus, the amount of amide groups is relatively small on the surface of the polymer layer 3 adjacent to the substrate 2. Thus, the adhesion between the substrate 2 and the polymer layer 3 may decrease particularly at high temperature and high humidity. Therefore, the lower layer resin 5$a$ preferably contains no fluorine-containing compound.

Owing to the presence of the fluorine-containing compound in the upper layer resin 5$b$, the surface energy of the polymer layer 3 can be reduced, and the optical member 1 having excellent water repellency can be obtained when combined with a moth-eye structure. The resulting optical member 1 therefore has excellent antifouling properties against hydrophilic dirt. The contact angle with water is used as an index to indicate the degree of water repellency. A greater contact angle with water indicates a higher degree of water repellency. In order to obtain the optical member 1 having a sufficiently high degree of water repellency, the contact angle of the surface of the polymer layer 3 opposite to the substrate 2 with water is preferably 60° or greater.

The fluorine-containing compound preferably has a fluorine atom concentration of 20 wt % or higher and 50 wt % or lower, more preferably 25 wt % or higher and 45 wt % or lower, still more preferably 30 wt % or higher and 40 wt % or lower. If the fluorine-containing compound has a fluorine atom concentration lower than 20 wt %, the amount of fluorine atoms is small and the fluorine atoms are less likely to be distributed on the surface of the polymer layer 3 opposite to the substrate 2, so that the adhesion between the substrate 2 and the polymer layer 3 may decrease particularly at high temperature and high humidity. If the fluorine-containing compound has a fluorine atom concentration higher than 50 wt %, the fluorine-containing compound may have a very low polarity and thus exhibit poor compatibility with the monofunctional amide monomer in the upper layer resin 5$b$, causing non-uniform distribution of the fluorine atoms. In this case, the fluorine atoms are less likely to be distributed on the surface of the polymer layer 3 opposite to the substrate 2, so that the adhesion between the substrate 2 and the polymer layer 3 may decrease particularly at high temperature and high humidity.

The lower layer resin 5a and the upper layer resin 5b may each appropriately contain additives such as a release agent and a polymerization initiator, in addition to the monofunctional amide monomer, the polyfunctional acrylate, the monofunctional acrylate, and the fluorine-containing compound.

The release agent is added to facilitate removal of the die 6 from the polymer layer 3 in the state shown in FIG. 1(d). Examples of the release agent include a fluorine-based release agent, a silicone-based release agent, and a phosphate-ester-based release agent. Examples of the fluorine-based release agent include the fluorine-containing compounds described above. Known examples thereof include a fluorine-based release agent (trade name: Optool AES4) from Daikin Industries, Ltd. Examples of the silicone-based release agent include silicone diacrylate. Known examples thereof include a silicone-based release agent (trade name: EBECRYL350) from Daicel-Allnex Ltd. Examples of the phosphate-ester-based release agent include (poly) oxyethylene alkyl phosphate ester. Known examples thereof include a phosphate-ester-based release agent (trade name: NIKKOL® TDP-2) from Nikko Chemicals Co., Ltd.

Examples of the polymerization initiator include a photo-polymerization initiator. The photo-polymerization initiator is active to active energy rays, and is added so as to initiate a polymerization reaction for polymerizing the monomers. Examples of the photo-polymerization initiator include radical polymerization initiators, anionic polymerization initiators, and cationic polymerization initiators. Examples of such a photo-polymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; benzyl ketals such as benzyl dimethyl ketal and hydroxycyclohexyl phenyl ketone; acyl phosphine oxides such as 2,4,6-trimethylbenzoyl-diphenyl-phosphine oxide and bis(2,4,6-trimethylbenzoyl)-phenylphosphine oxide; and alkylphenones such as 1-hydroxy-cyclohexyl-phenyl-ketone. Known examples of 2,4,6-trimethylbenzoyl-diphenyl-phosphine oxide include a photo-polymerization initiator (trade name: IRGACURE® TPO) from BASF. Known examples of bis(2,4,6-trimethylbenzoyl)-phenylphosphine oxide include a photo-polymerization initiator (trade name: IRGACURE 819) from BASF. Known examples of 1-hydroxy-cyclohexyl-phenyl-ketone include a photo-polymerization initiator (trade name: IRGACURE 184) from BASF.

At least one of the lower layer resin 5a and the upper layer resin 5b preferably contains no solvent. In other words, at least one of the lower layer resin 5a and the upper layer resin 5b is preferably of solvent-free. When at least one of the lower layer resin 5a and the upper layer resin 5b is of solvent-free, the cost relating to the use of a solvent and environmental load (e.g., malodor during use) can be reduced. Furthermore, this structure eliminates the need for a device for drying and removing a solvent, enabling reduction in equipment cost. When the lower layer resin 5a contains a solvent, if the solvent is insufficiently dried, the adhesion between the substrate 2 and the polymer layer 3 may decrease. In addition, when the upper layer resin 5b contains a solvent, if the upper layer resin 5b also contains a fluorine-containing compound, the fluorine-containing compound may be excessively mixed, and the fluorine atoms may be less likely to be distributed on the surface of the polymer layer 3 opposite to the substrate 2.

The lower layer resin 5a may have any thickness Da, but it is preferably 5 µm or more and 15 µm or less. As shown in FIG. 1(a), the thickness Da of the lower layer resin 5a in this embodiment refers to the distance from the surface of the lower layer resin 5a adjacent to the substrate 2 to the surface opposite to the substrate 2.

The upper layer resin 5b may have any thickness Db, but it is preferably 0.5 µm or more and 3 µm or less. As shown in FIG. 1(a), the thickness Db of the upper layer resin 5b in this embodiment refers to the distance from a portion corresponding to the bottom points of recesses in the die 6 to the surface of the upper layer resin 5b opposite to the die 6.

The viscosity of the upper layer resin 5b is preferably lower than that of the lower layer resin 5a. Specifically, the viscosity of the lower layer resin 5a at 25° C. is preferably lower than 200 mPa·s, more preferably lower than 150 mPa·s. The viscosity of the upper layer resin 5b is preferably lower than 30 mPa·s, more preferably lower than 20 mPa·s. If, at 25° C., the lower layer resin 5a has a viscosity of 200 mPa·s or higher and the upper layer resin 5b has a viscosity of 30 mPa·s or higher, the lower layer resin 5a and the upper layer resin 5b will not be easily mixed with each other, and the adhesion therebetween may decrease. When the viscosity of the upper layer resin 5b is lower than that of the lower layer resin 5a, if the upper layer resin 5b contains a fluorine-containing compound, the fluorine-containing compound can favorably exhibit its fluidity. Thus, in the state where the lower layer resin 5a and the upper layer resin 5b are stacked, the fluorine atoms in the upper layer resin 5b will be less likely to be mixed into the lower layer resin 5a and will be more likely to be distributed on the surface of the upper layer resin 5b (the polymer layer 3) opposite to the substrate 2. Herein, the viscosity is measured using a viscometer (trade name: DV2T) from Brookfield.

The polymer layer 3 has a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz (hereinafter, such storage modulus E' in the dynamic viscoelasticity measurement is also simply referred to as storage modulus E'). As shown in this embodiment, in the method for forming the polymer layer 3 with the lower layer resin 5a and the upper layer resin 5b, it is possible to increase the rubbing resistance at high temperature and high humidity by setting the bottom temperature and the minimum storage modulus E' in the above respective ranges. The polymer layer 3 having the bottom temperature and the minimum storage modulus E' out of the above respective ranges has poor rubbing resistance at high temperature and high humidity and, when its surface opposite to the substrate 2 is rubbed with a soft material such as nonwoven fabric, the projections 4 fallen by the rubbing fail to rise (restore) again, so that the optical member 1 appears white. In order to sufficiently increase the rubbing resistance of the polymer layer 3 at high temperature and high humidity, the polymer layer 3 preferably has a bottom temperature of 125° C. or higher and 195° C. or lower and a minimum storage modulus E' of $1.5 \times 10^8$ Pa or higher and $9 \times 10^8$ Pa or lower, more preferably a bottom temperature of 140° C. or higher and 180° C. or lower and a minimum storage modulus E' of $2\times10^8$ Pa or higher and $8\times10^8$ Pa or lower. The bottom temperature and the minimum storage modulus E' as used herein are determined based on the storage modulus E' that is measured with a viscoelasticity measuring apparatus (trade name: DMA7100) from Hitachi High-Tech Science Corporation as a measuring machine with a measurement temperature range of −50° C. to 250° C., a temperature rise rate of 5° C./min, and a frequency of 10 Hz. The bottom temperature and the minimum storage modulus E' can be adjusted by varying the composition of the polymer layer 3 (in particular, the compositions of the constituent components such as a monofunctional amide monomer in the lower layer resin 5a).

The relationship between the storage modulus E' and the rubbing resistance is described below.

Figure 2:
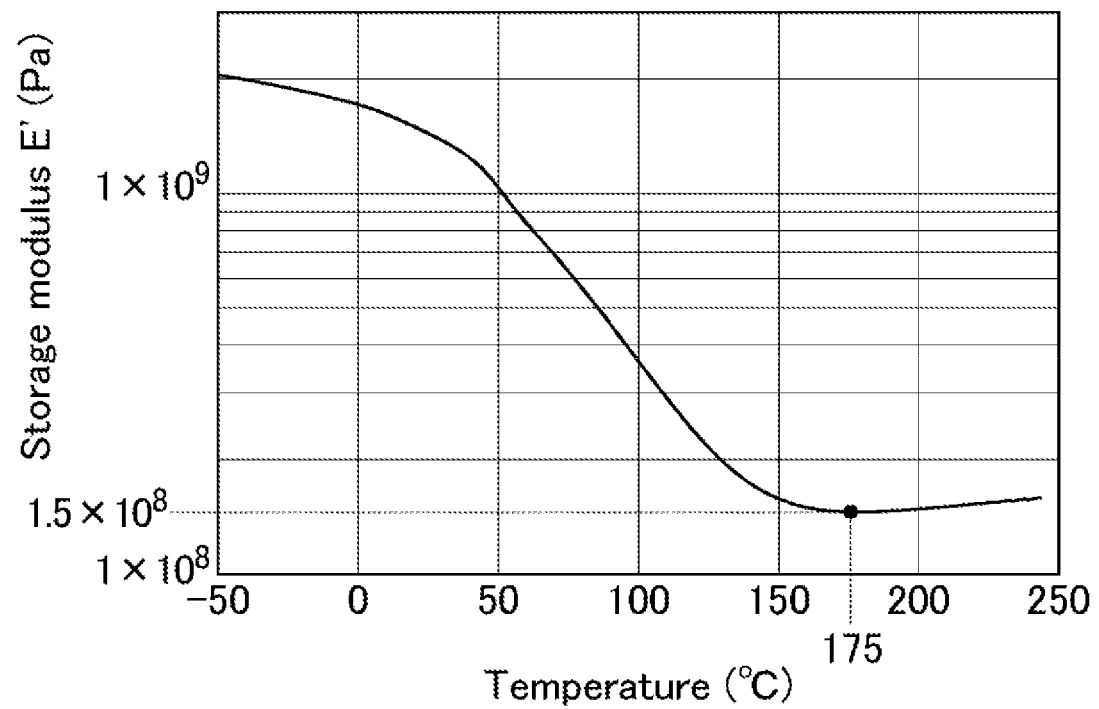
FIG. 2 is a graph showing a measurement example of storage modulus E' of a polymer layer.

FIG. 2 is a graph showing a measurement example of storage modulus E' of a polymer layer. As shown in FIG. 2, the storage modulus E' decreases as the temperature rises, and then stays constant or increases. The storage modulus E' starts increasing because the polymer layer 3 expands as the temperature rises. In FIG. 2, the bottom temperature at which the storage modulus E' is at the minimum is 175° C. and the minimum storage modulus E' is $1.5\times10^8$ Pa.

Figure 3:
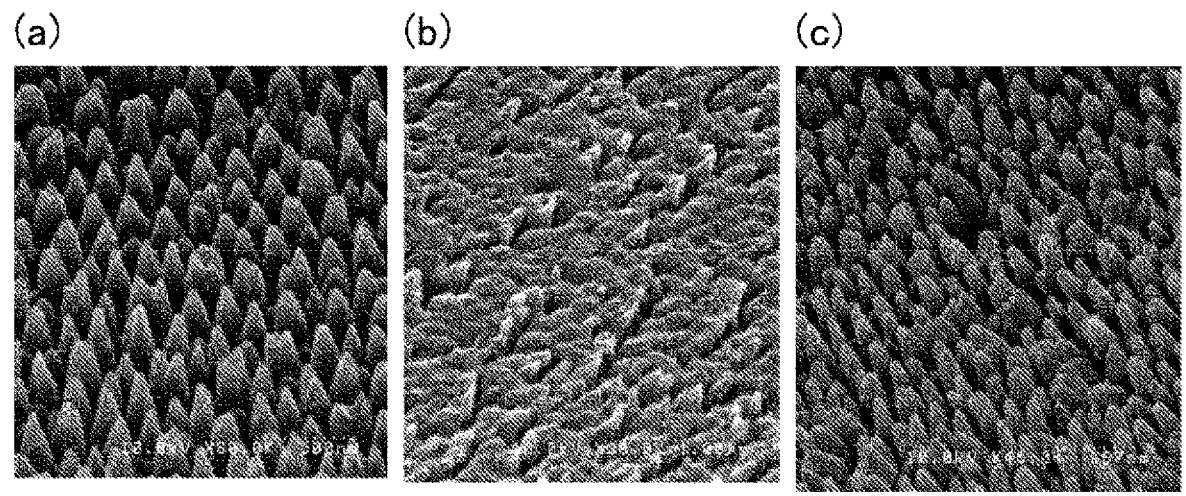
FIG. 3 shows SEM photographs of a polymer layer after rubbing.

FIG. 3 shows SEM photographs of a polymer layer after rubbing; FIG. 3(a) shows the case where the bottom temperature and the minimum storage modulus E' fall within the respective appropriate ranges, FIG. 3(b) shows the case where the minimum storage modulus E' is less than that in the case of FIG. 3(a), and FIG. 3(c) shows the case where at least one of the bottom temperature and the minimum storage modulus E' is higher than the corresponding value in the case of FIG. 3(a). Usually, a region with a high storage modulus E' is a crystalline region, a region with a lower storage modulus E' than the crystalline region is an elastic region, and a region with an even lower storage modulus E' is a fluid region. When the surface of the polymer layer 3 opposite to the substrate 2 is rubbed with a soft material such as nonwoven fabric, the projections 4 fall once. Here, with a storage modulus E' in the fluid region, the polymer layer 3 (projections 4) is soft and has insufficient elasticity, so that the projections 4 fail to rise (restore) again as shown in FIG. 3(b). Also, with a storage modulus E' in the crystalline region, the polymer layer 3 (projections 4) is hard and thus the projections 4 are less likely to fall but, as shown in FIG. 3(c), also less likely to rise (restore) again. In contrast, with the bottom temperature and the minimum storage modulus E' falling within the respective appropriate ranges as in the present embodiment, the polymer layer 3 (projections 4) has an appropriate elasticity, so that the projections 4 rise (restore) again as shown in FIG. 3(a). In other words, such a polymer layer 3 can exhibit excellent rubbing resistance. Here, with a minimum storage modulus E' falling within an appropriate range and a bottom temperature being higher than that in the state shown in FIG. 3(a), the environmental temperature during rubbing the surface of the polymer layer 3 opposite to the substrate 2 is significantly different from the bottom temperature to cause the polymer layer 3 (projections 4) to be very hard and insufficient in elasticity, so that the projections 4 fail to rise (restore) again as shown in FIG. 3(c).

The rubbing resistance is generally assumed to correlate with the crosslinking density and glass transition temperature (Tg) of the polymer layer 3. However, studies made by the present inventors have found that the rubbing resistance correlates better with the bottom temperature and the minimum storage modulus E', presumably for the following reason. The crosslinking density n is a value calculated from the formula: n=E'/3RT (E': storage modulus; R: gas constant; T: absolute temperature). The glass transition temperature Tg is a value (temperature) corresponding to the peak in a graph showing the temperature dependence of tan δ=E"/E' (E': storage modulus; E": loss modulus). In other words, the crosslinking density and the glass transition temperature are values obtained indirectly using values such as storage modulus E'. In contrast, the bottom temperature and the minimum storage modulus E' are values obtained directly from a graph showing the temperature dependence of the storage modulus E' as shown in FIG. 2. For this reason, restoration (rubbing resistance) of fine protrusions such as the projections 4 is considered to correlate better with the bottom temperature and the minimum storage modulus E'.

The polymer layer 3 may have any thickness D. Yet, when the upper layer resin 5b contains a fluorine-containing compound, the thickness D of the polymer layer 3 is preferably thin in order to distribute the fluorine atoms at a high concentration on the surface of the polymer layer 3 opposite to the substrate 2. Specifically, the thickness D is preferably 5.0 μm or more and 20.0 μm or less. The thickness D of the polymer layer 3 in this embodiment refers to the distance from the surface of the polymer layer 3 adjacent to the substrate 2 to the apex of the projections 4 as shown in FIG. 1(d).

The projections 4 may have any shape tapering toward the tip (a tapered shape) such as a shape consisting of a columnar lower part and a hemispherical upper part (templebell-like shape), and a conical shape (cone-like shape, circular-cone-like shape). The projections 4 may also have a shape with branched protrusions. Branched protrusions mean projections which are disposed at an irregular pitch and formed during anodizing and etching to produce a die for moth-eye structure formation. In FIG. 1(d), the base between adjacent projections 4 has an inclined shape, but may have a horizontal shape without inclination.

The pitch P between adjacent projections 4 may be any value that is not longer than the wavelength of visible light (780 nm). In order to sufficiently prevent optical phenomena such as moiré and iridescence, the pitch P is preferably 100 nm or greater and 400 nm or smaller, more preferably 100 nm or greater and 200 nm or smaller. Herein, the pitch between adjacent projections indicates the average of the distances between two adjacent projections except for branched projections within a 1-μm-square region in a plane image taken by a scanning electron microscope (trade name: S-4700) from Hitachi High-Technologies Corp. The pitch between adjacent projections is measured in the state where osmium(VIII) oxide from Wako Pure Chemical Industries, Ltd. is applied to a thickness of 5 nm on the uneven structure of the polymer layer, using an osmium coater "Neoc-ST" from Meiwafosis Co., Ltd.

The projections 4 may each have any height, but preferably have a height of 50 nm or greater and 600 nm or smaller, more preferably 100 nm or greater and 300 nm or smaller, in order to allow each projection 4 to also have a preferred aspect ratio (described later). Herein, the height of the projections indicates the average height of 10 consecutive projections except for branched projections in a cross-sectional image taken by a scanning electron microscope (trade name: S-4700) from Hitachi High-Technologies Corp. The 10 projections are selected so as not to include projections having any defect or deformed portion (e.g., a portion accidentally deformed during preparation of a sample). The sample is taken from a region where the optical member has no specific defect. For example, in the case of an optical member having a roll shape formed by continuous production, a sample is taken from a central region of the roll. The height of the projections is measured in the state where osmium(VIII) oxide from Wako Pure Chemical Industries, Ltd. is applied to a thickness of 5 nm on the uneven structure, using an osmium coater "Neoc-ST" from Meiwafosis Co., Ltd.

The projections 4 may each have any aspect ratio, but preferably have an aspect ratio of 0.8 or more and 1.5 or less. With the projections 4 each having an aspect ratio of 1.5 or less, the processability of the moth-eye structure is sufficiently high and there is less chance of occurrence of sticking and poor transferring conditions in formation of the moth-eye structure (e.g., clogging of die, twining of the material). When the projections 4 each have an aspect ratio of 0.8 or more, the optical member can sufficiently prevent occurrence of optical phenomena such as moiré and iridescence, achieving favorable reflection characteristics. Herein, the aspect ratio of the projections indicates the ratio of the height of the projection of interest and the pitch between adjacent projections measured as described above (height/pitch).

The projections 4 may be arranged in any manner, and may be arranged either randomly or regularly. In order to sufficiently prevent occurrence of moiré, the projections 4 are preferably arranged randomly.

The die 6 may be one produced by the following method. First, a film of aluminum that is a material of the die 6 is formed on a support substrate by sputtering. Next, the resulting aluminum layer is repetitively subjected to anodizing and etching. Thereby, a cavity (die 6) of the moth-eye structure can be produced. At this time, the uneven structure of the die 6 can be modified by adjusting the duration of the anodizing and the duration of the etching.

Non-limiting examples of a material of the support substrate include glass; metal materials such as stainless steel and nickel; polyolefinic resins such as polypropylene, polymethylpentene, and cyclic olefinic polymers (typified by norbornene-based resin, e.g., a polymer (trade name: Zeonor®) from Zeon Corp., a polymer (trade name: Arton®) from JSR Corp.; polycarbonate resin; and resin materials such as polyethylene terephthalate, polyethylene naphthalate, and triacetyl cellulose. Instead of the support substrate with an aluminum film formed on the surface, an aluminum substrate may be used.

The die 6 may have any shape such as a flat plate or a roll.

The surface of the die 6 preferably has undergone treatment with a release agent. In other words, the die 6 preferably has undergone release treatment. The release treatment on the die 6 allows the die 6 to be easily released from the polymer layer 3 in the above step (d). The release treatment on the die 6 can make the surface energy of the die 6 low. Thus, when the upper layer resin 5b contains a fluorine-containing compound, it is possible to efficiently distribute the fluorine atoms on the surface of the upper layer resin 5b opposite to the substrate 2 when the die 6 is pressed against the lower layer resin 5a from the upper layer resin 5b side in the above step (b). This treatment can also prevent early removal of the fluorine atoms from the surface of the resin layer 7 opposite to the substrate 2 before curing of the resin layer 7. As a result, in the optical member 1, the fluorine atoms can efficiently be distributed on the surface of the polymer layer 3 opposite to the substrate 2.

Examples of the release agent to be applied to the die 6 include fluorine-based, silicone-based, and phosphate-ester-based release agents. Preferred are fluorine-based release agents. When the upper layer resin 5b contains a fluorine-containing compound, use of a fluorine-based release agent to perform release treatment on the die 6 allows the fluorine-based release agent to strongly interact with the fluorine-containing compound so that the fluorine atoms can be more efficiently distributed on the surface of the upper layer resin 5b opposite to the substrate 2.

Thus, the method for producing an optical member of Embodiment 1 can provide the optical member 1 capable of achieving both adhesion between the substrate 2 and the polymer layer 3 and rubbing resistance at high temperature and high humidity.

Figure 4:
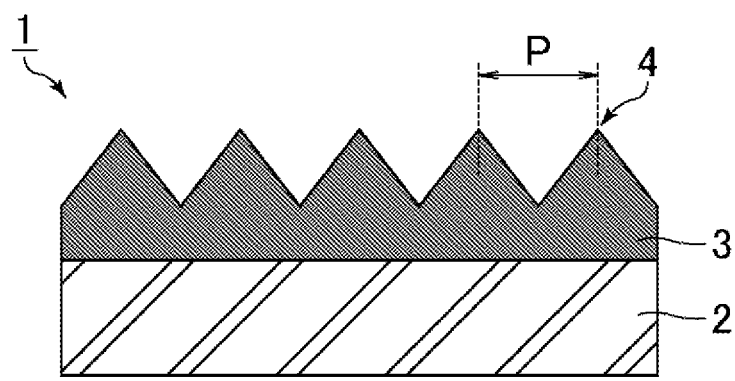
FIG. 4 shows a schematic cross-sectional view of an optical member of Embodiment 1.

Next, an optical member of Embodiment 1 is described below with reference to FIG. 4. FIG. 4 shows a schematic cross-sectional view of an optical member of Embodiment 1.

The optical member 1 includes the substrate 2 and the polymer layer 3 that is in direct contact with the substrate 2. The polymer layer 3 includes on a surface thereof an uneven structure provided with multiple projections (protrusions) 4 at a pitch (distance between the apexes of adjacent projections 4) P not longer than a wavelength of visible light. The optical member 1 therefore corresponds to an antireflective member having on a surface thereof a moth-eye structure (a structure like a moth's eye). Thus, the optical member 1 can exhibit excellent antireflective properties (low reflectivity) owing to the moth-eye structure.

The polymer layer 3 is a cured product of a resin layer that includes an uneven structure on a surface thereof and that is formed by pressing a die against a lower layer resin having an amide group concentration of 1.5 mmol/g or more and less than 5 mmol/g and an upper layer resin from the upper layer resin side in a state where the lower layer resin and the upper layer resin are sequentially stacked from the substrate 2 side. This arrangement results in the polymer layer 3 in which the amount of the amide group is greater on the surface adjacent to the substrate 2. The polymer layer 3 in which the lower layer resin has an amide group concentration of less than 1.5 mmol/g contains too small an amount of the amide group on the surface adjacent to the substrate 2, so that the adhesion between the substrate 2 and the polymer layer 3 will be reduced particularly at high temperature and high humidity. The polymer layer 3 in which the lower layer resin has an amide group concentration of 5 mmol/g or more has a low crosslinking density and a very strong cohesive force between bonds, thus exhibiting high hardness and low rubbing resistance at high temperature and high humidity.

The polymer layer 3 has a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./rain, and a frequency of 10 Hz. The polymer layer 3 having the bottom temperature and the minimum storage modulus E' out of the above respective ranges has poor rubbing resistance at high temperature and high humidity and, when its surface opposite to the substrate 2 is rubbed with a soft material such as nonwoven fabric, the projections 4 fallen by the rubbing fail to rise (restore) again, so that the optical member 1 appears white.

Thus, according to Embodiment 1, it is possible to provide the optical member 1 capable of achieving both adhesion between the substrate 2 and the polymer layer 3 and rubbing resistance at high temperature and high humidity.

An exemplary optical member of Embodiment 1 is an optical member produced by the method for producing an optical member of Embodiment 1 described above.

Embodiment 2

Figure 5:
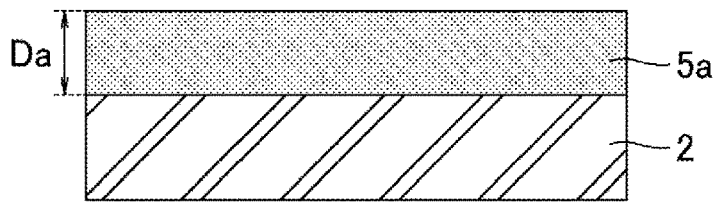
FIG. 5 shows schematic cross-sectional views illustrating a production process of an optical member of Embodiment 2 (steps a to e).
Figure 5:
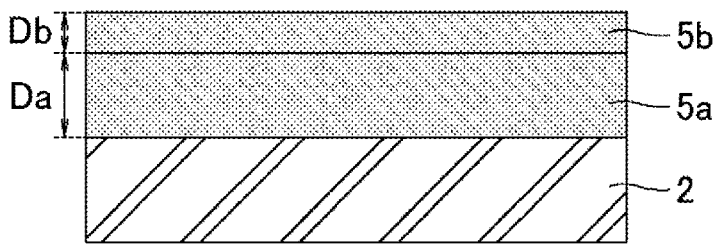
Figure 5:
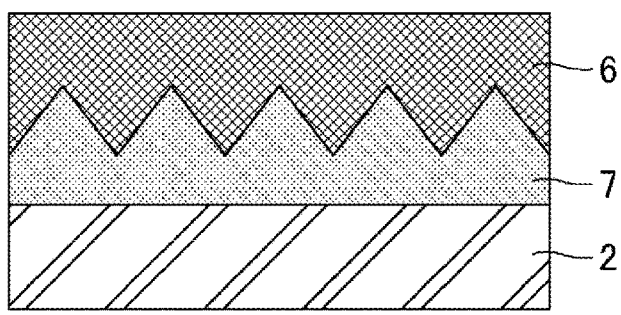
Figure 5:
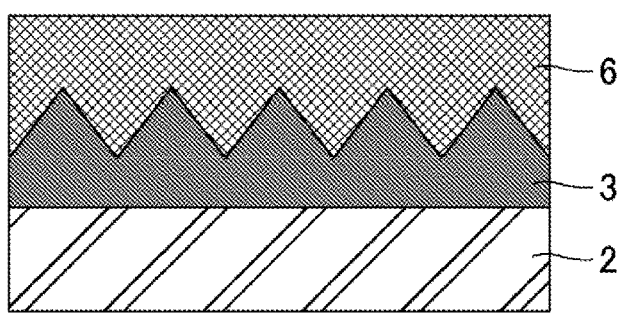
Figure 5:
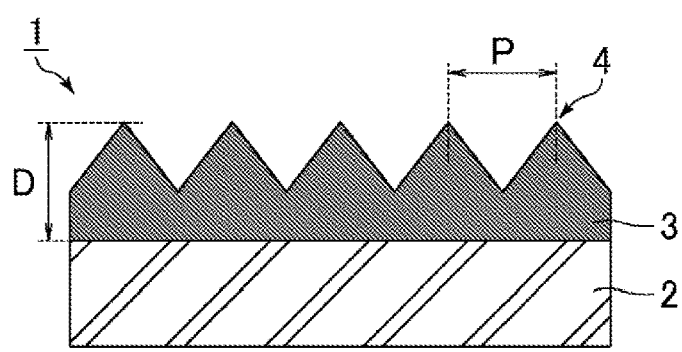

A method for producing an optical member of Embodiment 2 is described below with reference to FIG. 5. FIG. 5 shows schematic cross-sectional views illustrating a production process of an optical member of Embodiment 2 (steps a to e). The method for producing an optical member of Embodiment 2 is the same as the method for producing an optical member of Embodiment 1, except that the lower layer resin and the upper layer resin are sequentially applied to the substrate. Thus, repetitive descriptions are appropriately omitted. The optical member of Embodiment 2 is the same as the optical member of Embodiment 1, and description thereof is thus omitted.

(a) Application of Lower Layer Resin

First, as shown in FIG. 5(a), the lower layer resin 5a is applied to the substrate 2. Thus, the lower layer resin 5a formed is in direct contact with the substrate 2.

(b) Application of Upper Layer Resin

As shown in FIG. 5(b), the upper layer resin 5b is applied to the lower layer resin 5a applied. As a result, the upper layer resin 5b is formed on the lower layer resin 5a, on the side opposite to the substrate 2.

(c) Formation of Uneven Structure

As shown in FIG. 5(c), in a state where the lower layer resin 5a and the upper layer resin 5b applied are sequentially stacked from the substrate 2 side, the die 6 is pressed against the lower layer resin 5a and the upper layer resin 5b from the upper layer resin 5b side, so as to form the resin layer 7 including an uneven structure on a surface thereof.

(d) Curing of Resin Layer

The resin layer 7 including the uneven structure is cured. As a result, the polymer layer 3 as shown in FIG. 5(d) is formed.

(e) Release of Die

The die 6 is released from the polymer layer 3. As a result, the optical member 1 as shown in FIG. 5(e) is completed.

Embodiment 3

Figure 6:
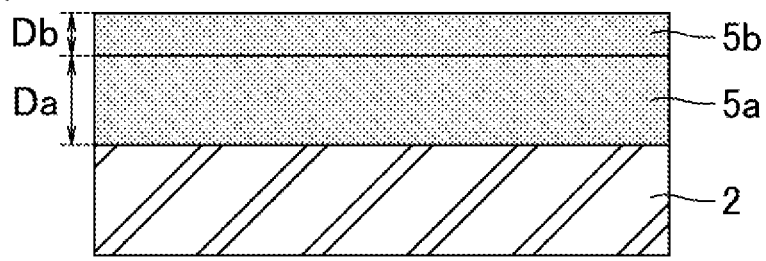
FIG. 6 shows schematic cross-sectional views illustrating a production process of an optical member of Embodiment 3 (steps a to d).
Figure 6:
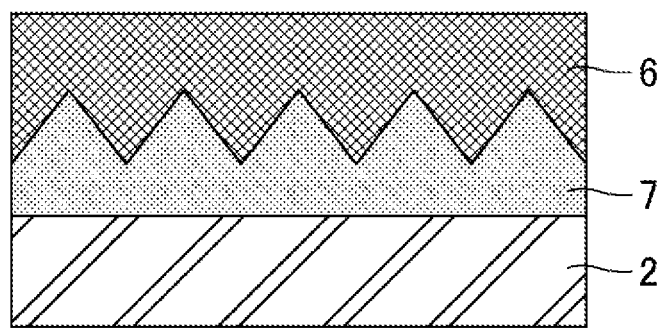
Figure 6:
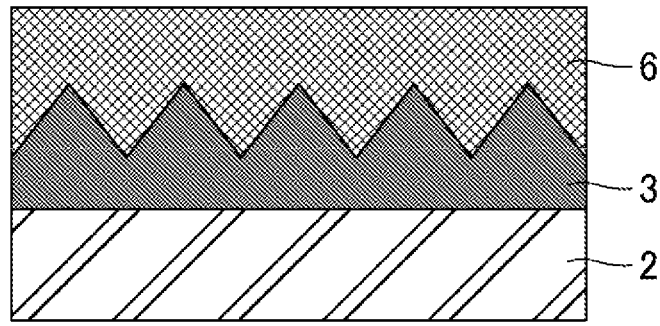
Figure 6:
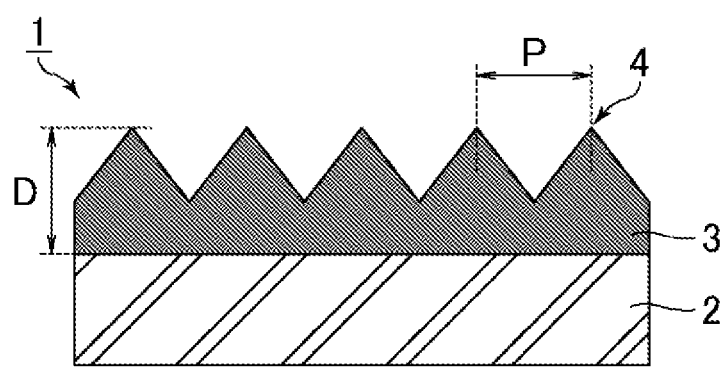

A method for producing an optical member of Embodiment 3 is described below with reference to FIG. 6. FIG. 6 shows schematic cross-sectional views illustrating a production process of an optical member of Embodiment 3 (steps a to d). The method for producing an optical member of Embodiment 3 is the same as the method for producing an optical member of Embodiment 1, except that the lower layer resin and the upper layer resin are simultaneously applied to the substrate. Thus, repetitive descriptions are appropriately omitted. The optical member of Embodiment 3 is the same as the optical member of Embodiment 1, and description thereof is thus omitted.

(a) Application of Lower Layer Resin and Upper Layer Resin

First, as shown in FIG. 6(a), the lower layer resin 5a and the upper layer resin 5b are simultaneously applied to the substrate 2. As a result, the upper layer resin 5b is formed on the lower layer resin 5a, on the side opposite to the substrate 2. Examples of the method for simultaneously applying the lower layer resin 5a and the upper layer resin 5b include an application method such as co-extrusion.

(b) Formation of Uneven Structure

As shown in FIG. 6(b), in a state where the lower layer resin 5a and the upper layer resin 5b applied are sequentially stacked from the substrate 2 side, the die 6 is pressed against the lower layer resin 5a and the upper layer resin 5b from the upper layer resin 5b side, so as to form the resin layer 7 including an uneven structure on a surface thereof.

(c) Curing of Resin Layer

The resin layer 7 including the uneven structure is cured. As a result, the polymer layer 3 as shown in FIG. 6(c) is formed.

(d) Release of Die

The die 6 is released from the polymer layer 3. As a result, the optical member 1 as shown in FIG. 6(d) is completed.

The method for producing an optical member of Embodiment 3 includes simultaneously applying the lower layer resin 5a and the upper layer resin 5b. Thus, the number of steps can be reduced compared to the case where the method for producing an optical member of Embodiment 2 is employed.

Hereinafter, the present invention is described in more detail based on examples and comparative examples. These examples, however, are not intended to limit the scope of the present invention.

(Composition Materials)

Composition materials used to produce the optical members in the examples and the comparative examples are as follows.

(Lower Layer Resins LR-1 to LR-36)

Various lower layer resins having compositions shown in Tables 1 to 12 were used. Tables 1 to 12 show the amide group concentration in each lower layer resin and the amount of the monofunctional amide monomer in each lower layer resin. Abbreviations for the names of the materials in Tables 1 to 12 indicate the following.

<Polyfunctional Acrylate>

"UA": urethane acrylate ("UA-306H" from Kyoeisha Chemical Co., Ltd.)

"PA": urethane acrylate ("U-10PA" from Shin Nakamura Chemical Co., Ltd.)

"ATM": ethoxylatedpentaerythritoltetraacrylate ("ATM-35E" from Shin Nakamura Chemical Co., Ltd.)

"TMM": pentaerythritol triacrylate ("A-TMM-3LM-N" from Shin Nakamura Chemical Co., Ltd.)

"PET": pentaerythritol triacrylate ("PET-3" from DKS Co. Ltd.)

"DPE": dipentaerythritol hexaacrylate ("Light Acrylate DPE-6A" from Kyoeisha Chemical Co., Ltd.)

"#802": a mixture of tripentaerythritol acrylate, mono- and di-pentaerythritol acrylates, and polypentaerythritol acrylate ("Viscoat#802" from Osaka Organic Chemical Industry Ltd.)

"PG": ethoxylated polyglycerin polyacrylate ("NK ECONOMER A-PG5027E" from Shin Nakamura Chemical Co., Ltd.)

"DPEA": alkoxylated dipentaerythritol polyacrylate ("KAYARAD DPEA-12" from Nippon Kayaku Co., Ltd.)

"DPCA": alkoxylated dipentaerythritol polyacrylate ("KAYARAD DPCA-30" from Nippon Kayaku Co., Ltd.)

"EB": hexafunctional polyester acrylate ("EBECRYL450" from Daicel-Alinex Ltd.)

"A": polyethylene glycol 600 diacrylate ("A-600" from Shin Nakamura Chemical Co., Ltd.)

<Monofunctional Acrylate>

"AP": polypropylene glycol monoacrylate ("AP-550" from NOF Corporation)

"HBA": 4-hydroxybutyl acrylate ("4HBA" from Nihon Kasei Co., Ltd.)

<Monofunctional Amide Monomer>
"AC": N-acryloylmorpholine ("ACMO" from KJ Chemicals Corp.)
"DM": N,N-dimethylacrylamide ("DMAA" from KJ Chemicals Corp.)
"DE": N,N-diethylacrylamide ("DEAA" from KJ Chemicals Corp.)

<Polymerization Initiator>
"TPO": 2,4,6-trimethylbenzoyl-diphenyl-phosphine oxide ("IRGACURE TPO" from BASF)

TABLE 1

| | | | Lower layer resin LR-1 | | Lower layer resin LR-2 | | Lower layer resin LR-3 | | Lower layer resin LR-4 | |
|---|---|---|---|---|---|---|---|---|---|---|
| Composition | Polyfunctional acrylate | Material name | PA | ATM | PA | ATM | PA | ATM | PA | ATM |
| | | Amount (parts by weight) | 22 | 48 | 16 | 45 | 23 | 51 | 25 | 54 |
| | Monofunctional acrylate | Material name | — | | — | | — | | — | |
| | | Amount (parts by weight) | — | | — | | — | | — | |
| | Monofunctional amide monomer | Material name | DM | | DM | | DM | | DM | |
| | | Amount (parts by weight) | 30 | | 39 | | 26 | | 21 | |
| | Polymerization initiator | Material name | TPO | | TPO | | TPO | | TPO | |
| | | Amount (parts by weight) | 0.5 | | 0.5 | | 0.5 | | 0.5 | |
| Amide group concentration in lower layer resin (mmol/g) | | | 3.02 | | 3.92 | | 2.61 | | 2.11 | |
| Amount of monofunctional amide monomer in lower layer resin (wt %) | | | 29.9 | | 38.8 | | 25.9 | | 20.9 | |

TABLE 2

| | | | Lower layer resin LR-5 | | Lower layer resin LR-6 | | Lower layer resin LR-7 | | Lower layer resin LR-8 | |
|---|---|---|---|---|---|---|---|---|---|---|
| Composition | Polyfunctional acrylate | Material name | PA | ATM | PA | ATM | PA | ATM | UA | DPEA |
| | | Amount (parts by weight) | 28 | 56 | 14 | 42 | 13 | 38 | 10 | 60 |
| | Monofunctional acrylate | Material name | — | | — | | — | | — | |
| | | Amount (parts by weight) | — | | — | | — | | — | |
| | Monofunctional amide monomer | Material name | DM | | DM | | DM | | DM | |
| | | Amount (parts by weight) | 16 | | 44 | | 49 | | 30 | |
| | Polymerization initiator | Material name | TPO | | TPO | | TPO | | TPO | |
| | | Amount (parts by weight) | 0.5 | | 0.5 | | 0.5 | | 0.5 | |
| Amide group concentration in lower layer resin (mmol/g) | | | 1.61 | | 4.42 | | 4.92 | | 3.02 | |
| Amount of monofunctional amide monomer in lower layer resin (wt %) | | | 15.9 | | 43.8 | | 48.8 | | 29.9 | |

TABLE 3

| | | | Lower layer resin LR-9 | | | Lower layer resin LR-10 | | Lower layer resin LR-11 | |
|---|---|---|---|---|---|---|---|---|---|
| Composition | Polyfunctional acrylate | Material name | UA | TMM | DPEA | DPE | DPEA | DPE | DPEA |
| | | Amount (parts by weight) | 10 | 6 | 54 | 2 | 68 | 10 | 60 |
| | Monofunctional acrylate | Material name | — | | | — | | — | |
| | | Amount (parts by weight) | — | | | — | | — | |
| | Monofunctional amide monomer | Material name | DM | | | DM | | DM | |
| | | Amount (parts by weight) | 30 | | | 30 | | 30 | |
| | Polymerization initiator | Material name | TPO | | | TPO | | TPO | |
| | | Amount (parts by weight) | 0.5 | | | 0.5 | | 0.5 | |
| Amide group concentration in lower layer resin (mmol/g) | | | 3.02 | | | 3.02 | | 3.02 | |
| Amount of monofunctional amide monomer in lower layer resin (wt %) | | | 29.9 | | | 29.9 | | 29.9 | |

TABLE 4

| | | | Lower layer resin LR-12 | | Lower layer resin LR-13 | | | Lower layer resin LR-14 | | |
|---|---|---|---|---|---|---|---|---|---|---|
| Composition | Polyfunctional acrylate | Material name | DPEA | | PA | ATM | #802 | PA | ATM | #802 |
| | | Amount (parts by weight) | 66 | | 27 | 25 | 26 | 29 | 24 | 27 |
| | Monofunctional acrylate | Material name | HBA | | — | | | — | | |
| | | Amount (parts by weight) | 4 | | — | | | — | | |
| | Monofunctional amide monomer | Material name | DM | | DM | | | DM | | |
| | | Amount (parts by weight) | 30 | | 22 | | | 20 | | |
| | Polymerization initiator | Material name | TPO | | TPO | | | TPO | | |
| | | Amount (parts by weight) | 0.5 | | 0.5 | | | 0.5 | | |
| Amide group concentration in lower layer resin (mmol/g) | | | 3.02 | | 2.21 | | | 2.01 | | |
| Amount of monofunctional amide monomer in lower layer resin (wt %) | | | 29.9 | | 21.9 | | | 19.9 | | |

TABLE 5

| | | | Lower layer resin LR-15 | | | Lower layer resin LR-16 | | Lower layer resin LR-17 | |
|---|---|---|---|---|---|---|---|---|---|
| Composition | Polyfunctional acrylate | Material name | PA | ATM | #802 | PA | PG | PA | PG |
| | | Amount (parts by weight) | 29 | 24 | 28 | 16 | 64 | 15 | 65 |
| | Monofunctional acrylate | Material name | — | | | — | | — | |
| | | Amount (parts by weight) | — | | | — | | — | |
| | Monofunctional amide monomer | Material name | DM | | | DM | | DM | |
| | | Amount (parts by weight) | 19 | | | 20 | | 20 | |
| | Polymerization initiator | Material name | TPO | | | TPO | | TPO | |
| | | Amount (parts by weight) | 0.5 | | | 0.5 | | 0.5 | |
| Amide group concentration in lower layer resin (mmol/g) | | | 1.91 | | | 2.01 | | 2.01 | |
| Amount of monofunctional amide monomer in lower layer resin (wt %) | | | 18.9 | | | 19.9 | | 19.9 | |

TABLE 6

| | | | Lower layer resin LR-18 | | Lower layer resin LR-19 | | Lower layer resin LR-20 | | Lower layer resin LR-21 | |
|---|---|---|---|---|---|---|---|---|---|---|---|
| Composition | Polyfunctional acrylate | Material name | #802 | PG | PA | ATM | PA | ATM | PA | ATM |
| | | Amount (parts by weight) | 14 | 66 | 18 | 39 | 19 | 42 | 26 | 61 |
| | Monofunctional acrylate | Material name | — | | — | | — | | — | |
| | | Amount (parts by weight) | — | | — | | — | | — | |
| | Monofunctional amide monomer | Material name | DM | | AC | | DE | | DM | |
| | | Amount (parts by weight) | 20 | | 43 | | 39 | | 13 | |
| | Polymerization initiator | Material name | TPO | | TPO | | TPO | | TPO | |
| | | Amount (parts by weight) | 0.5 | | 0.5 | | 0.5 | | 0.5 | |
| Amide group concentration in lower layer resin (mmol/g) | | | 2.01 | | 3.03 | | 3.06 | | 1.31 | |
| Amount of monofunctional amide monomer in lower layer resin (wt %) | | | 19.9 | | 42.8 | | 38.8 | | 12.9 | |

TABLE 7

| | | | Lower layer resin LR-22 | | Lower layer resin LR-23 | | Lower layer resin LR-24 | | | |
|---|---|---|---|---|---|---|---|---|---|---|
| Composition | Polyfunctional acrylate | Material name | PA | ATM | PA | ATM | DPE | PET | DPEA | A |
| | | Amount (parts by weight) | 32 | 68 | 11 | 37 | 17.5 | 17.5 | 17.5 | 17.5 |
| | Monofunctional acrylate | Material name | — | | — | | — | | | |
| | | Amount (parts by weight) | — | | — | | — | | | |
| | Monofunctional amide monomer | Material name | — | | DM | | DM | | | |
| | | Amount (parts by weight) | — | | 52 | | 30 | | | |
| | Polymerization initiator | Material name | TPO | | TPO | | TPO | | | |
| | | Amount (parts by weight) | 0.5 | | 0.5 | | 0.5 | | | |
| Amide group concentration in lower layer resin (mmol/g) | | | 0 | | 5.23 | | 3.02 | | | |
| Amount of monofunctional amide monomer in lower layer resin (wt %) | | | 0 | | 51.7 | | 29.9 | | | |

TABLE 8

| | | | Lower layer resin LR-25 | | Lower layer resin LR-26 | | Lower layer resin LR-27 | |
|---|---|---|---|---|---|---|---|---|
| Composition | Polyfunctional acrylate | Material name | PET | DPCA | ATM | DPEA | ATM | PG |
| | | Amount (parts by weight) | 12 | 58 | 30 | 40 | 56 | 14 |
| | Monofunctional acrylate | Material name | — | | — | | — | |
| | | Amount (parts by weight) | — | | — | | — | |
| | Monofunctional amide monomer | Material name | DM | | DM | | DM | |
| | | Amount (parts by weight) | 30 | | 30 | | 30 | |
| | Polymerization initiator | Material name | TPO | | TPO | | TPO | |
| | | Amount (parts by weight) | 0.5 | | 0.5 | | 0.5 | |
| Amide group concentration in lower layer resin (mmol/g) | | | 3.02 | | 3.02 | | 3.02 | |
| Amount of monofunctional amide monomer in lower layer resin (wt %) | | | 29.9 | | 29.9 | | 29.9 | |

TABLE 9

| | | | Lower layer resin LR-28 | | | Lower layer resin LR-29 | | | Lower layer resin LR-30 | | |
|---|---|---|---|---|---|---|---|---|---|---|---|
| Composition | Polyfunctional acrylate | Material name | #802 | PG | DPEA | ATM | PG | PA | #802 | PG | |
| | | Amount (parts by weight) | 2 | 68 | 9 | 35 | 35 | 11 | 5 | 84 | |
| | Monofunctional acrylate | Material name | — | | | — | | | — | | |
| | | Amount (parts by weight) | — | | | — | | | — | | |
| | Monofunctional amide monomer | Material name | DM | | | DM | | | — | | |
| | | Amount (parts by weight) | 21 | | | 30 | | | — | | |
| | Polymerization initiator | Material name | TPO | | | TPO | | | TPO | | |
| | | Amount (parts by weight) | 0.5 | | | 0.5 | | | 0.5 | | |
| Amide group concentration in lower layer resin (mmol/g) | | | 2.11 | | | 3.02 | | | 0 | | |
| Amount of monofunctional amide monomer in lower layer resin (wt %) | | | 20.9 | | | 29.9 | | | 0 | | |

TABLE 10

| | | | Lower layer resin LR-31 | | Lower layer resin LR-32 | | | |
|---|---|---|---|---|---|---|---|---|
| Composition | Polyfunctional acrylate | Material name | PA | PG | DPE | PET | DPEA | A |
| | | Amount (parts by weight) | 50 | 50 | 33 | 9 | 20 | 18 |
| | Monofunctional acrylate | Material name | — | | — | | | |
| | | Amount (parts by weight) | — | | — | | | |
| | Monofunctional amide monomer | Material name | — | | DM | | | |
| | | Amount (parts by weight) | — | | 20 | | | |
| | Polymerization initiator | Material name | TPO | | TPO | | | |
| | | Amount (parts by weight) | 0.5 | | 0.5 | | | |
| Amide group concentration in lower layer resin (mmol/g) | | | 0 | | 2.01 | | | |
| Amount of monofunctional amide monomer in lower layer resin (wt %) | | | 0 | | 19.9 | | | |

TABLE 11

| | | | Lower layer resin LR-33 | | | | Lower layer resin LR-34 | | |
|---|---|---|---|---|---|---|---|---|---|
| Composition | Polyfunctional acrylate | Material name | DPE | PET | DPEA | A | DPE | EB | A |
| | | Amount (parts by weight) | 40 | 9 | 20 | 15 | 46 | 18 | 6 |
| | Monofunctional acrylate | Material name | — | | | | — | | |
| | | Amount (parts by weight) | — | | | | — | | |
| | Monofunctional amide monomer | Material name | DM | | | | DM | | |
| | | Amount (parts by weight) | 16 | | | | 30 | | |
| | Polymerization initiator | Material name | TPO | | | | TPO | | |
| | | Amount (parts by weight) | 0.5 | | | | 0.5 | | |
| Amide group concentration in lower layer resin (mmol/g) | | | 1.61 | | | | 3.02 | | |
| Amount of monofunctional amide monomer in lower layer resin (wt %) | | | 15.9 | | | | 29.9 | | |

TABLE 12

| | | | Lower layer resin LR-35 | Lower layer resin LR-36 |
|---|---|---|---|---|
| Composition | Polyfunctional acrylate | Material name | — | — |
| | | Amount (parts by weight) | — | — |
| | Monofunctional acrylate | Material name | AP | AP |
| | | Amount (parts by weight) | 55 | 80 |
| | Monofunctional amide monomer | Material name | DM | DM |
| | | Amount (parts by weight) | 45 | 20 |
| | Polymerization initiator | Material name | TPO | TPO |
| | | Amount (parts by weight) | 1.5 | 1.5 |
| Amide group concentration in lower layer resin (mmol/g) | | | 4.48 | 1.99 |
| Amount of monofunctional amide monomer in lower layer resin (wt %) | | | 44.3 | 19.7 |

(Upper Layer Resin UR-1)

First, solvent displacement was performed for a fluorine-based additive ("Ftergent 650A" from Neos Co., Ltd.) from methyl isobutyl ketone to N,N-diethylacrylamide ("DEAA" from KJ Chemicals Corp.), using a rotary evaporator (trade name: N-1110 series) from Tokyo Rikakikai Co, Ltd., followed by heating in a mini jet oven (trade name: MD-92) from Toyama Sangyo Co., Ltd. at a temperature of 180° C. for five hours. After heating, N,N-diethylacrylamide ("DEAA" from KJ Chemicals Corp.) was added to produce an upper layer resin UR-1 whose solids content (fluorine-containing compound) was controlled to 15 wt %. The upper layer resin UR-1 had a viscosity at 25° C. of 11 mPa·s.

(Upper Layer Resins UR-2 to UR-11)

These upper layer resins were produced by the same production method as used for the upper layer resin UR-1, except that different compositions shown in Tables 13 to 15 were used. Tables 13 to 15 also show the viscosity at 25° C. of each upper layer resin. Abbreviations for the names of the materials in Tables 13 to 15 indicate the following.

<Solids Content (Fluorine-Containing Compound)>

"650A": fluorine-based additive ("Ftergent 650A" from Neos Co., Ltd.)

"RS": fluorine-based additive ("Megaface RS-76-NS" from DIC)

"DAC": fluorine-based additive ("Optool DAC-HP" from Daikin Industries, Ltd.)

<Solvent>
  "AC": N-acryloylmorpholine ("ACMO" from KJ Chemicals Corp.)
  "DE": N,N-diethylacrylamide ("DEAA" from KJ Chemicals Corp.)
  "APG": dipropylene glycol diacrylate ("APG-100" from Shin Nakamura Chemical Co., Ltd.)

<Release Agent>
  (Poly) oxyethylene alkyl phosphate ester ("NIKKOL TDP-2" from Nikko Chemicals Co., Ltd.): 0.1 parts by weight <Polymerization Initiator>
  1-Hydroxy-cyclohexyl-phenyl-ketone ("IRGACURE 184" from BASF): 1 part by weight

TABLE 13

| | | | Upper layer resin UR-1 | Upper layer resin UR-2 | Upper layer resin UR-3 | Upper layer resin UR-4 |
|---|---|---|---|---|---|---|
| Composition | Solids content (fluorine-containing compound) | Material name | 650A | 650A | 650A | 650A |
| | | Concentration (wt %) | 15 | 0.1 | 5 | 10 |
| | Solvent | Material name | DE | DE | DE | DE |
| | | Concentration (wt %) | 85 | 99.9 | 95 | 90 |
| | Viscosity (mPa·s) | | 11 | 1.8 | 3.2 | 7.3 |

TABLE 14

| | | | Upper layer resin UR-5 | Upper layer resin UR-6 | Upper layer resin UR-7 | Upper layer resin UR-8 |
|---|---|---|---|---|---|---|
| Composition | Solids content (fluorine-containing compound) | Material name | 650A | 650A | 650A | 650A |
| | | Concentration (wt %) | 20 | 25 | 30 | 32 |
| | Solvent | Material name | DE | DE | DE | DE |
| | | Concentration (wt %) | 80 | 75 | 70 | 68 |
| | Viscosity (mPa·s) | | 15 | 17 | 20 | 24 |

TABLE 15

| | | | Upper layer resin UR-9 | Upper layer resin UR-10 | Upper layer resin UR-11 |
|---|---|---|---|---|---|
| Composition | Solids content (fluorine-containing compound) | Material name | — | RS | DAC |
| | | Concentration (wt %) | — | 10 | 15 |
| | Solvent | Material name | DE  APG | AC  APG | AC |
| | | Concentration (wt %) | 80  20 | 50  40 | 85 |
| | Viscosity (mPa·s) | | 2.8 | 12 | 18 |

(Upper Layer Resin UR-12)

A mixture of the following materials was used. An upper layer resin UR-12 did not contain a fluorine-containing compound. The upper layer resin UR-12 had a viscosity at 25° C. of 410 mPa·s.

<Polyfunctional Acrylate>
  Dipentaerythritol hexaacrylate ("A-DPH" from Shin Nakamura Chemical Co., Ltd.): 25 parts by weight
  Pentaerythritol triacrylate ("PET-3" from DKS Co. Ltd.): 25 parts by weight
  Alkoxylated dipentaerythritol polyacrylate ("KAYARAD DPEA-12" from Nippon Kayaku Co., Ltd.): 25 parts by weight
  Polyethylene glycol 600 diacrylate ("A-600" from Shin Nakamura Chemical Co., Ltd.): 25 parts by weight Bis(2,4,6-trimethylbenzoyl)-phenylphosphine oxide ("IRGACURE 819" from BASF): 0.5 parts by weight Example 1

An optical member of Example 1 was produced by the method for producing an optical member of Embodiment 1.
(a) Application of Lower Layer Resin and Upper Layer Resin First, the lower layer resin 5a was applied to the substrate 2 using a bar coater (trade name: No. 05) from Daiichi Rika Co., Ltd. As a result, the lower layer resin 5a was formed in direct contact with the substrate 2. Meanwhile, the upper layer resin 5b was applied to an irregular surface of the die 6. Specifically, first, the upper layer resin 5b was applied to a polyethylene terephthalate film (PET film) using a bar coater (trade name: No. 05) from Daiichi Rika Co., Ltd. The polyethylene terephthalate film to which the upper layer resin 5b was applied was attached to the irregular surface of the die 6 from the upper layer resin 5b side using a laminate roller (trade name: RM20-100) from Issin Industry Co., Ltd. Then, the polyethylene terephthalate film was removed. As a result, the upper layer resin 5b was formed on the irregular surface of the die 6.

The substrate 2 used was a triacetyl cellulose film (trade name: TAC-TD80U) from Fujifilm Corp. The substrate 2 had a thickness of 80 μm.

The lower layer resin 5a was the lower layer resin LR-1 described above. The lower layer resin 5a had a thickness Da of 9 μm. The upper layer resin 5b was the upper layer resin UR-1 described above. The upper layer resin 5b had a thickness Db of 1 μm.

The die 6 used was one produced by the following method. First, a film of aluminum that is a material of the die 6 was formed on a surface of a 10-cm-square glass substrate by sputtering. The aluminum layer formed had a thickness of 1.0 μm. Next, the resulting aluminum layer was repetitively subjected to anodizing and etching. Thereby, an anodizing layer was formed with many fine pores (distance between the bottom points of adjacent pores is not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum (a tapered shape). As a result, the die 6 having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die 6 was found to have a recess depth of 290 nm by scanning electron microscopic observation. The surface of the die 6 was subjected to release treatment with a fluorine-based release agent (trade name: Optool AES4) from Daikin Industries, Ltd. in advance.

(b) Formation of Uneven Structure

The die 6 to which the upper layer resin 5b was applied was pressed against (attached to) the lower layer resin 5a applied to the substrate 2 from the upper layer resin 5b side using a laminate roller (trade name: RM20-100) from Issin Industry Co., Ltd. Thus, the upper layer resin 5b was stacked on the lower layer resin 5a and an uneven structure was formed simultaneously. As a result, the resin layer 7 including the uneven structure on its surface opposite to the substrate 2 was formed.

(c) Curing of Resin Layer

The resin layer 7 including the uneven structure was irradiated with ultraviolet rays (dose: 1 J/cm$^2$) from the substrate 2 side to effect curing (polymerization). As a result, the polymer layer 3 was formed.

(d) Release of Die

The die 6 was released from the polymer layer 3. As a result, the optical member 1 was completed. The surface specifications of the optical member 1 were as follows. Shape of projections 4: temple-bell-like shape Pitch P between adjacent projections 4: 200 nm Height of projection 4: 200 nm
Aspect ratio of projection 4: 1

The polymer layer 3 had a thickness D of 10 μm. The polymer layer 3 had a bottom temperature of 176° C. The polymer layer 3 had a minimum storage modulus E' of 2.3×10$^8$ Pa. The measurement sample used for storage modulus E' was a cured product (polymer layer) having a rectangular cross-sectional shape (length: 35 mm, width: 5 mm, thickness: 1 mm) obtained by applying ultraviolet rays (dose: 1 J/cm$^2$) to a mixture of the lower layer resin 5a (90 parts by weight) and the upper layer resin 5b (10 parts by weight). The storage modulus E' was measured with each end of the measurement sample clamped. The length of the portion not clamped was 20 mm.

Examples 2 to 30 and Comparative Examples 1 to 14

An optical member of each example was produced in the same manner as in Example 1, except that different materials shown in Tables 16 to 23 were used. Tables 16 to 23 show the bottom temperature of the polymer layer of each example and the minimum storage modulus E' of the polymer layer of each example. Abbreviations for the names of the materials in Tables 16 to 23 indicate the following.
<Lower Layer Resin>
"LR-1" to "LR-36": lower layer resins LR-1 to LR-36
<Upper Layer Resin>
"UR-1" to "UR-12": upper layer resins UR-1 to UR-12

Comparative Example 15

Figure 7:
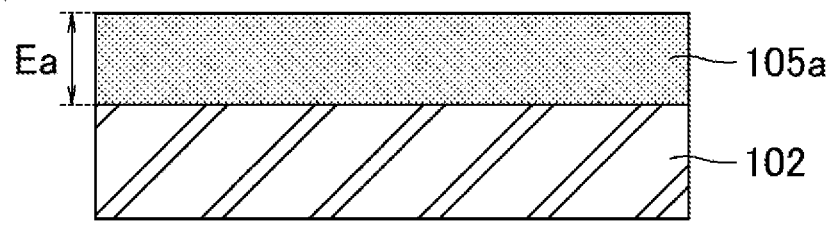
FIG. 7 shows schematic cross-sectional views illustrating a production process of an optical member of Comparative Example 15 (steps a to d).
Figure 7:
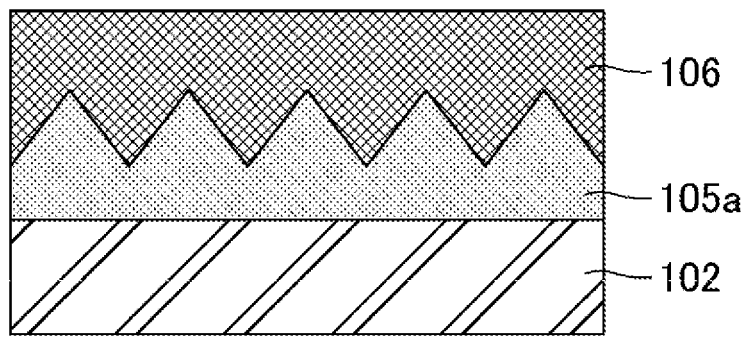
Figure 7:
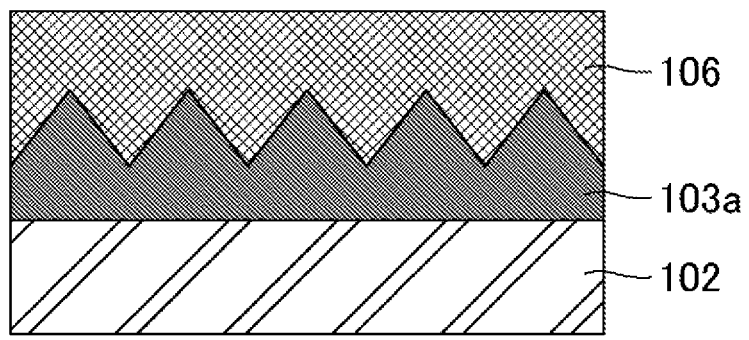
Figure 7:
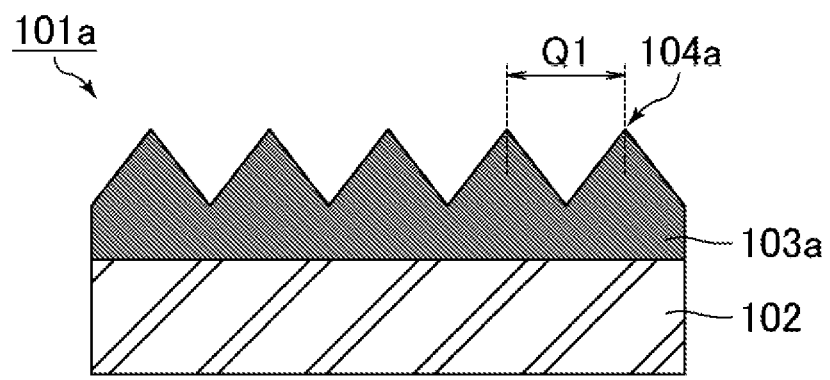

Using the materials shown in Table 23, an optical member of Comparative Example 15 was produced by the production process shown in FIG. 7. FIG. 7 shows schematic cross-sectional views illustrating a production process of the optical member of Comparative Example 15 (steps a to d).
(a) Application of Lower Layer Resin First, as shown in FIG. 7(a), a lower layer resin 105a (lower layer resin LR-5) was applied to a substrate 102 using a bar coater (trade name: No. 05) from Daiichi Rika Co., Ltd. The lower layer resin 105a had a thickness Ea of 9 μm.

The substrate 102 was a triacetyl cellulose film (trade name: TAC-TD80U) from Fujifilm Corp. The substrate 102 had a thickness of 80 μm.
(b) Formation of Uneven Structure As shown in FIG. 7(b), a die 106 was pressed against the lower layer resin 105a applied, whereby an uneven structure was formed.

The die 106 used was one produced by the following method. First, a film of aluminum that is a material of the die 106 was formed on a surface of a 10-cm-square glass substrate by sputtering. The thickness of the resulting aluminum layer was 1.0 μm. Next, the resulting aluminum layer was repetitively subjected to anodizing and etching. Thereby, an anodizing layer was formed with many fine pores (distance between the bottom points of adjacent pores is not longer than the wavelength of visible light). Specifically, anodizing, etching, anodizing, etching, anodizing, etching, anodizing, etching, and anodizing were performed successively (anodizing: 5 times, etching: 4 times), so that many fine pores (recesses) were formed each tapering toward the inside of the aluminum (a tapered shape). As a result, the die 106 having an uneven structure was obtained. The anodizing was performed using oxalic acid (concentration: 0.03 wt %) at a liquid temperature of 5° C. and an applied voltage of 80 V. The duration of a single anodizing process was 25 seconds. The etching was performed using phosphoric acid (concentration: 1 mol/l) at a liquid temperature of 30° C. The duration of a single etching process was 25 minutes. The die 106 was found to have a recess depth of 290 nm by scanning electron microscopic observation. The surface of the die 106 was subjected to release treatment with a fluorine-based release agent (trade name: Optool AES4) from Daikin Industries, Ltd. in advance.

(c) Curing of Lower Layer Resin

The lower layer resin 105a including the uneven structure was irradiated with ultraviolet rays (dose: 1 J/cm$^2$) from the substrate 102 side to effect curing. As a result, a polymer layer 103a as shown in FIG. 7(c) was formed.

(d) Release of Die

The die 106 was released from the polymer layer 103a. As a result, an optical member 101a as shown in FIG. 7(d) was completed. The surface specifications of the optical member 101a were as follows.

Shape of projections 104a: temple-bell-like shape
Pitch Q1 between adjacent projections 104a: 200 nm
Height of projection 104a: 200 nm
Aspect ratio of projection 104a: 1

Comparative Example 16

Figure 8:
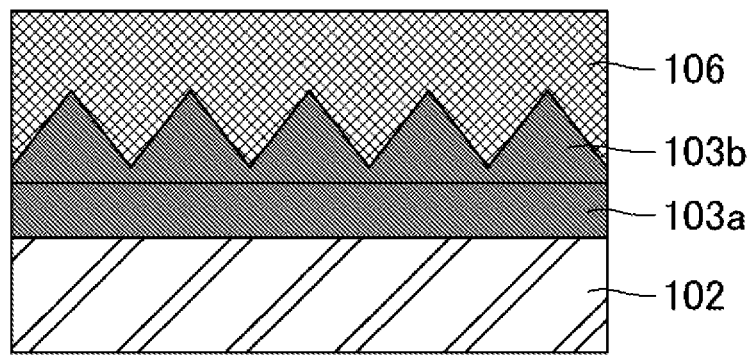
Figure 2:
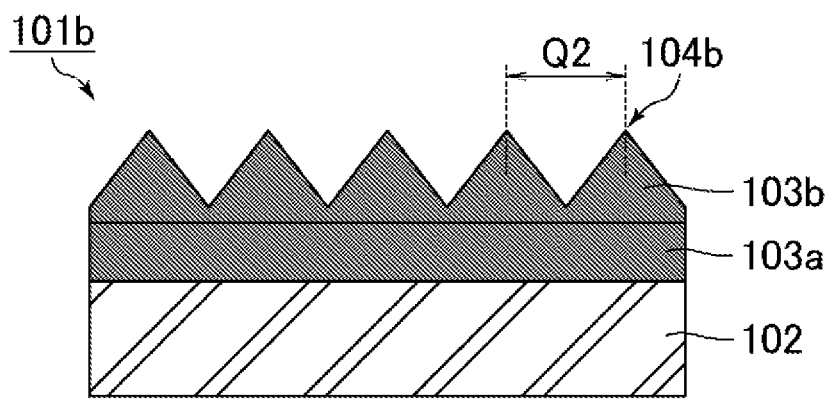

Using the materials shown in Table 23, an optical member of Comparative Example 16 was produced by the production process as shown in FIG. 8-1 and FIG. 8-2. FIG. 8-1 shows schematic cross-sectional views illustrating the production process of the optical member of Comparative Example 16 (steps a to d). FIG. 8-2 shows schematic cross-sectional views illustrating the production process of the optical member of Comparative Example 16 (steps e to f). This comparative example corresponds to Example 3 in Patent Literature 3 described above.

(a) Application of Lower Layer Resin

First, as shown in FIG. 8-1(a), the lower layer resin 105a (lower layer resin LR-35) was applied to the substrate 102 using a bar coater (trade name: No. 05) from Daiichi Rika Co., Ltd. The lower layer resin 105a had a thickness Ea of 10 μm. The substrate 102 was the same as the one used in Comparative Example 15.

(b) Curing of Lower Layer Resin

The lower layer resin 105a applied was irradiated with ultraviolet rays (dose: 1 J/cm$^2$) from the substrate 102 side to effect curing. As a result, the polymer layer 103a as shown in FIG. 8-1(b) was formed.

(c) Application of Upper Layer Resin

As shown in FIG. 8-1(c), an upper layer resin 105b (upper layer resin UR-12) was applied to the irregular surface of the die 106. Specifically, first, the upper layer resin 105b was applied to a polyethylene terephthalate film using a bar coater (trade name: No. 05) from Daiichi Rika Co., Ltd. The polyethylene terephthalate film to which the upper layer resin 105b was applied was attached to the irregular surface of the die 106 from the upper layer resin 105b side using a laminate roller (trade name: RM20-100) from Issin Industry Co., Ltd. Then, the polyethylene terephthalate film was removed. As a result, the upper layer resin 105b was formed on the irregular surface of the die 106. The upper layer resin 105b had a thickness Eb of 10 μm. The die 106 used was the same one as used in Comparative Example 15.

(d) Formation of Uneven Structure

As shown in FIG. 8-1(d), the die 106 to which the upper layer resin 105b was applied was pressed against (attached to) the polymer layer 103a formed on the substrate 102 from the upper layer resin 105b side using a laminate roller (trade name: RM20-100) from Issin Industry Co., Ltd. Thus, the upper layer resin 105b was stacked on the polymer layer 103a and an uneven structure was formed simultaneously.

(e) Curing of Upper Layer Resin

The upper layer resin 105b including the uneven structure was irradiated with ultraviolet rays (dose: 1 J/cm$^2$) from the substrate 102 side to effect curing. As a result, a polymer layer 103b as shown in FIG. 8-2(e) was formed. The polymer layer 103a and the polymer layer 103b were completely separated from each other, and an interface was present therebetween.

(f) Release of Die

The die 106 was released from the polymer layer 103b. As a result, an optical member 101b as shown in FIG. 8-2(f) was completed. The surface specifications of the optical member 101b were as follows.

Shape of projections 104b: temple-bell-like shape
Pitch Q2 between adjacent projections 104b: 200 nm
Height of projection 104b: 200 nm
Aspect ratio of projection 104b: 1

Comparative Example 17

An optical member of Comparative Example 17 was produced in the same manner as in Comparative Example 16, except that different materials shown in Table 23 were used. This comparative example corresponds to Example 8 in Patent Literature 4 mentioned above.

Comparative Example 18

Figure 9:
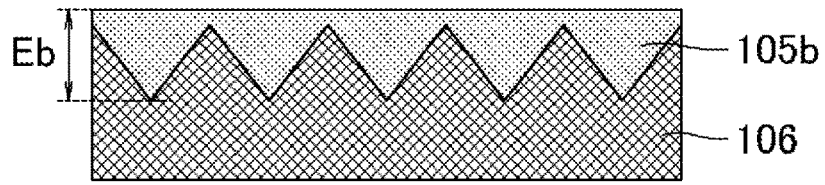
FIG. 9 shows schematic cross-sectional views illustrating a production process of an optical member of Comparative Example 18 (steps a to d).
Figure 9:
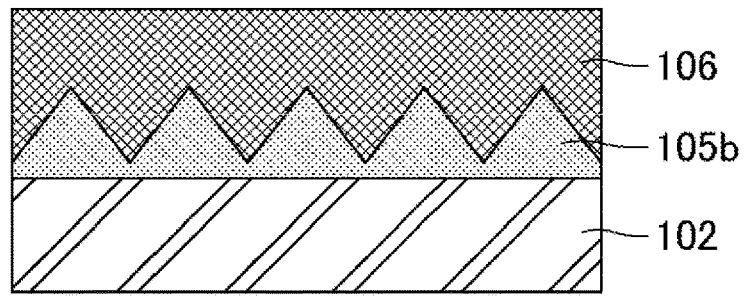
Figure 9:
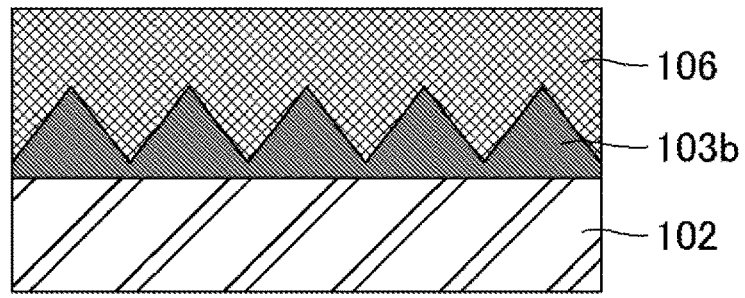
Figure 9:
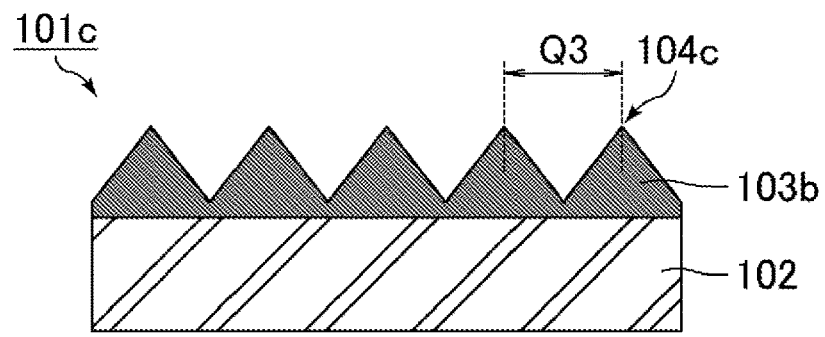

Using the materials shown in Table 23, an optical member of Comparative Example 18 was produced by the production process shown in FIG. 9. FIG. 9 shows schematic cross-sectional views illustrating a production process of the optical member of Comparative Example 18 (steps a to d). This comparative example corresponds to an example in which a composition for forming a surface layer was used in Patent Literature 3 mentioned above.

(a) Application of Upper Layer Resin

First, as shown in FIG. 9(a), the upper layer resin 105b (upper layer resin UR-12) was applied to the irregular surface of the die 106. Specifically, first, the upper layer resin 105b was applied to a polyethylene terephthalate film using a bar coater (trade name: No. 05) from Daiichi Rika Co., Ltd. The polyethylene terephthalate film to which the upper layer resin 105b was applied was attached to the irregular surface of the die 106 from the upper layer resin 105b using a laminate roller (trade name: RM20-100) from Issin Industry Co., Ltd. Then, the polyethylene terephthalate film was removed. As a result, the upper layer resin 105b was formed on the irregular surface of the die 106. The upper layer resin 105b had a thickness Eb of 10 μm. The die 106 used was the same one as used in Comparative Example 15. The substrate 102 was provided. The substrate 102 was the same one as used in Comparative Example 15.

(b) Formation of Uneven Structure

As shown in FIG. 9(b), the die 106 to which the upper layer resin 105b was applied was pressed against (attached to) the substrate 102 from the upper layer resin 105b side using a laminate roller (trade name: RM20-100) from Issin Industry Co., Ltd. Thus, the upper layer resin 105b was stacked on the substrate 102 and an uneven structure was formed simultaneously.

(c) Curing of Upper Layer Resin

The upper layer resin 105b including the uneven structure was irradiated with ultraviolet rays (dose: 1 J/cm$^2$) from the substrate 102 side to effect curing. As a result, the polymer layer 103b as shown in FIG. 9(c) was formed.

(d) Release of Die

The die 106 was released from the polymer layer 103b. As a result, an optical member 101c as shown in FIG. 9(d) was completed. The surface specifications of the optical member 101c were as follows.

Shape of projection 104c: temple-bell-like shape
Pitch Q3 between adjacent projections 104c: 200 nm
Height of projection 104c: 200 nm
Aspect ratio of projection 104c: 1

[Evaluation of Optical Member]

Tables 16 to 23 show evaluation results of the adhesion (hereinafter also simply referred to as "adhesion") between the substrate and the polymer layer and the rubbing resistance of the optical members of Examples 1 to 30 and Comparative Examples 1 to 18.

(Evaluation of Adhesion)

The adhesion at room temperature and normal humidity was evaluated by the following method. First, for the optical member of each example, the surface (surface of the uneven structure) of the polymer layer opposite to the substrate was wiped with 100 strokes using wiping cloth (trade name: Elleair Prowipe Soft Wipes S220) from Daio Paper Corporation. Then, the optical member of each example was left at a temperature of 23° C. and a humidity of 50% for three days. Next, 11 vertical cuts and 11 horizontal cuts were made in a grid pattern with 1 mm spacing on the surface of the polymer layer opposite to the substrate using a snap-off utility knife. Thus, 100 squares (1 mm square) were formed. Then, polyester adhesive tape (trade name: No. 31B) from Nitto Denko Corp. was press-applied to the squares and peeled off in the 90° direction relative to the surface of the squares at a rate of 100 mm/s. The condition of the polymer layer on the substrate after the peeling was visually observed, and the number of squares in which the polymer layer peeled off from the substrate was counted. The results are shown as "X/100", where X is the number of squares in which the polymer layer peeled from the substrate. The determination criteria are as follows.

Level A: None of 100 squares peeled (0/100).
Level B: One to 99 out of 100 squares peeled (1/100 to 99/100).
Level C: 100 out of 100 squares peeled (100/100).

Optical members at Level A were determined as having no practical problems (having high adhesion at room temperature and normal humidity).

The adhesion at high temperature and high humidity was evaluated by the following method. First, for the optical member of each example, the surface (surface of the uneven structure) of the polymer layer opposite to the substrate was wiped with 100 strokes using wiping cloth (trade name: Elleair Prowipe Soft Wipes 5220) from Daio Paper Corporation. Then, the optical member of each example was left at a temperature of 60° C. and a humidity of 95% for three days, and was further left under the original conditions at a temperature of 23° C. and a humidity of 50% for one day. Next, 11 vertical cuts and 11 horizontal cuts were made in a grid pattern with 1 mm spacing on the surface of the polymer layer opposite to the substrate using a snap-off utility knife. Thus, 100 squares (1 mm square) were formed. Then, polyester adhesive tape (trade name: No. 31B) from Nitto Denko Corp. was press-applied to the squares and peeled off in the 90° direction relative to the surface of the squares at a rate of 100 mm/s. The condition of the polymer layer on the substrate after the peeling was visually observed, and the number of squares in which the polymer layer peeled off from the substrate was counted. The results are shown as "X/100", where X is the number of squares in which the polymer layer peeled from the substrate. The determination criteria are as follows.

Level a: None of 100 squares peeled (0/100).
Level b: One or two out of 100 squares peeled (1/100 to 2/100).
Level c: Three to five out of 100 squared peeled (3/100 to 5/100).
Level d: Six to 99 out of 100 squares peeled (6/100 to 99/100).
Level e: 100 out of 100 squares peeled (100/100). Optical members at Level a, Level b, or Level c were determined as having no practical problems (having high adhesion at high temperature and high humidity).

Based on the evaluation results of the adhesion at room temperature and normal humidity and the adhesion at high temperature and high humidity by the methods described above, the comprehensive evaluation of the adhesion was made as follows.

Excellent: Adhesion at room temperature and normal humidity was at Level A and adhesion at high temperature and high humidity was at Level a.

Good: Adhesion at room temperature and normal humidity was at Level A and adhesion at high temperature and high humidity was at Level b.

Fair: Adhesion at room temperature and normal humidity was at Level A and adhesion at high temperature and high humidity was at Level c.

Poor: Adhesion at room temperature and normal humidity was at Level A or Level B and adhesion at high temperature and high humidity was at Level d or Level e.

Bad: Adhesion at room temperature and normal humidity was at Level C and adhesion at high temperature and high humidity was at Level e.

Optical members with the comprehensive evaluation of excellent, good, or fair were determined as having no practical problems.

The rubbing resistance at high temperature and high humidity was evaluated based on the reflectance of the optical member of each example before and after rubbing the surface of the optical member with nonwoven fabric. Specifically, a black acrylic plate was attached to the surface of the substrate opposite to the polymer layer of the optical member of each example. Subsequently, at a temperature of 23° C. and a humidity of 50%, the surface of the polymer layer opposite to the substrate in the optical member of each example was irradiated with light from a light source from a polar angle of 5° and the specular spectral reflectance at an incident angle of 5° was measured. The reflectance was measured with a spectrophotometer (trade name: UV-3100PC) from Shimadzu Corporation within the wavelength range of 380 to 780 nm. The average reflectance within the wavelength range of 450 to 650 nm was calculated based on the measurement results. The average reflectance is referred to as Reflectance A (unit: %).

After the reflectance measurement, the optical member of each example was left at a temperature of 60° C. and a humidity of 95% for one day, and was further left under the original conditions at a temperature of 23° C. and a humidity of 50% for one day. Then, the surface of the polymer layer of the optical member of each example opposite to the substrate was rubbed with 10 strokes using nonwoven fabric (trade name: BEMCOT®LABO) from Asahi Kasei Fibers Corp. Subsequently, the specular spectral reflectance at an incident angle of 5° of the optical member of each example was measured by the same procedure as described above. The average reflectance within the wavelength range of 450 to 650 nm was calculated based on the measurement results. The average reflectance is referred to as Reflectance B (unit: %).

The rubbing resistance was evaluated using "change (unit: %) in reflectance before and after rubbing=100×(Reflectance B−Reflectance A)/Reflectance A", and the evaluation criteria are as follows.

Excellent: Change in reflectance was 15% or less.
Good: Change in reflectance was more than 15% and less than 25%.
Fair: Change in reflectance was 25% or more and 30% or less.
Poor: Change in reflectance was more than 30% and less than 50%.
Bad: Change in reflectance was 50% or more.

Optical members with the evaluation of excellent, good, or fair were determined as having no practical problems (having high rubbing resistance at high temperature and high humidity).

TABLE 16

|  |  |  | Example 1 | Example 2 | Example 3 | Example 4 | Example 5 | Example 6 |
|---|---|---|---|---|---|---|---|---|
|  | Lower layer resin | Material name | LR-1 | LR-2 | LR-3 | LR-4 | LR-5 | LR-6 |
|  | Upper layer resin | Material name | UR-1 | UR-1 | UR-1 | UR-1 | UR-1 | UR-1 |
|  | Bottom temperature (° C.) of polymer layer |  | 176 | 179 | 176 | 170 | 166 | 188 |
|  | Minimum storage modulus E' (×10$^8$ Pa) of polymer layer |  | 2.3 | 2 | 2.6 | 3 | 3.3 | 1.7 |
| Adhesion | Room temperature/ normal humidity | Result | 0/100 | 0/100 | 0/100 | 0/100 | 0/100 | 0/100 |
|  |  | Evaluation | Level A | Level A | Level A | Level A | Level A | Level A |
|  | High temperature/ high humidity | Result | 0/100 | 0/100 | 0/100 | 1/100 | 5/100 | 0/100 |
|  |  | Evaluation | Level a | Level a | Level a | Level b | Level c | Level a |
|  | Comprehensive evaluation |  | Excellent | Excellent | Excellent | Good | Fair | Excellent |
| Rubbing resistance | High temperature/ high humidity | Change (%) in reflectance | 13 | 14 | 12 | 10 | 10 | 19 |
|  |  | Evaluation | Excellent | Excellent | Excellent | Excellent | Excellent | Good |

TABLE 17

|  |  |  | Example 7 | Example 8 | Example 9 | Example 10 | Example 11 | Example 12 |
|---|---|---|---|---|---|---|---|---|
|  | Lower layer resin | Material name | LR-7 | LR-8 | LR-9 | LR-10 | LR-11 | LR-12 |
|  | Upper layer resin | Material name | UR-1 | UR-1 | UR-1 | UR-1 | UR-1 | UR-1 |
|  | Bottom temperature (° C.) of polymer layer |  | 202 | 191 | 208 | 169 | 202 | 165 |
|  | Minimum storage modulus E' (×10$^8$ Pa) of polymer layer |  | 1 | 2.7 | 2.5 | 1.5 | 1.9 | 1.1 |
| Adhesion | Room temperature/ normal humidity | Result | 0/100 | 0/100 | 0/100 | 0/100 | 0/100 | 0/100 |
|  |  | Evaluation | Level A | Level A | Level A | Level A | Level A | Level A |
|  | High temperature/ high humidity | Result | 0/100 | 0/100 | 0/100 | 0/100 | 0/100 | 0/100 |
|  |  | Evaluation | Level a | Level a | Level a | Level a | Level a | Level a |
|  | Comprehensive evaluation |  | Excellent | Excellent | Excellent | Excellent | Excellent | Excellent |
| Rubbing resistance | High temperature/ high humidity | Change (%) in reflectance | 29 | 18 | 30 | 25 | 26 | 29 |
|  |  | Evaluation | Fair | Good | Fair | Fair | Fair | Fair |

TABLE 18

|  |  |  | Example 13 | Example 14 | Example 15 | Example 16 | Example 17 | Example 18 |
|---|---|---|---|---|---|---|---|---|
|  | Lower layer resin | Material name | LR-13 | LR-14 | LR-15 | LR-16 | LR-17 | LR-18 |
|  | Upper layer resin | Material name | UR-1 | UR-1 | UR-1 | UR-1 | UR-1 | UR-1 |
|  | Bottom temperature (° C.) of polymer layer |  | 178 | 194 | 209 | 141 | 126 | 113 |
|  | Minimum storage modulus E' (×10$^8$ Pa) of polymer layer |  | 7.7 | 8.2 | 9.8 | 2.2 | 1.6 | 1.1 |
| Adhesion | Room temperature/ normal humidity | Result | 0/100 | 0/100 | 0/100 | 0/100 | 0/100 | 0/100 |
|  |  | Evaluation | Level A | Level A | Level A | Level A | Level A | Level A |
|  | High temperature/ high humidity | Result | 1/100 | 2/100 | 2/100 | 2/100 | 2/100 | 2/100 |
|  |  | Evaluation | Level b | Level b | Level b | Level b | Level b | Level b |
|  | Comprehensive evaluation |  | Good | Good | Good | Good | Good | Good |
| Rubbing resistance | High temperature/ high humidity | Change (%) in reflectance | 15 | 19 | 28 | 15 | 24 | 30 |
|  |  | Evaluation | Excellent | Good | Fair | Excellent | Good | Fair |

TABLE 19

|  |  |  | Example 19 | Example 20 | Example 21 | Example 22 | Example 23 | Example 24 |
|---|---|---|---|---|---|---|---|---|
|  | Lower layer resin | Material name | LR-1 | LR-1 | LR-1 | LR-1 | LR-1 | LR-1 |
|  | Upper layer resin | Material name | UR-2 | UR-3 | UR-4 | UR-5 | UR-6 | UR-7 |
|  | Bottom temperature (° C.) of polymer layer |  | 177 | 176 | 176 | 176 | 176 | 175 |
|  | Minimum storage modulus E' (×10$^8$ Pa) of polymer layer |  | 2.2 | 2.2 | 2.3 | 2.3 | 2.4 | 2.4 |
| Adhesion | Room temperature/ normal humidity | Result | 0/100 | 0/100 | 0/100 | 0/100 | 0/100 | 0/100 |
|  |  | Evaluation | Level A | Level A | Level A | Level A | Level A | Level A |
|  | High temperature/ high humidity | Result | 0/100 | 0/100 | 0/100 | 0/100 | 1/100 | 2/100 |
|  |  | Evaluation | Level a | Level a | Level a | Level a | Level b | Level b |
|  | Comprehensive evaluation |  | Excellent | Excellent | Excellent | Excellent | Good | Good |
| Rubbing resistance | High temperature/ high humidity | Change (%) in reflectance | 21 | 17 | 13 | 13 | 13 | 14 |
|  |  | Evaluation | Good | Good | Excellent | Excellent | Excellent | Excellent |

TABLE 20

|  |  |  | Example 25 | Example 26 | Example 27 | Example 28 | Example 29 | Example 30 |
|---|---|---|---|---|---|---|---|---|
|  | Lower layer resin | Material name | LR-1 | LR-1 | LR-1 | LR-1 | LR-19 | LR-20 |
|  | Upper layer resin | Material name | UR-8 | UR-9 | UR-10 | UR-11 | UR-1 | UR-1 |
|  | Bottom temperature (° C.) of polymer layer |  | 176 | 174 | 174 | 177 | 193 | 176 |
|  | Minimum storage modulus E' (×10$^8$ Pa) of polymer layer |  | 2.5 | 2.2 | 2.4 | 2.3 | 1.5 | 2 |
| Adhesion | Room temperature/ normal humidity | Result | 0/100 | 0/100 | 0/100 | 0/100 | 0/100 | 0/100 |
|  |  | Evaluation | Level A | Level A | Level A | Level A | Level A | Level A |
|  | High temperature/ high humidity | Result | 4/100 | 0/100 | 0/100 | 0/100 | 0/100 | 0/100 |
|  |  | Evaluation | Level c | Level a | Level a | Level a | Level a | Level a |
|  | Comprehensive evaluation |  | Fair | Excellent | Excellent | Excellent | Excellent | Excellent |
| Rubbing resistance | High temperature/ high humidity | Change (%) in reflectance | 15 | 26 | 12 | 11 | 25 | 15 |
|  |  | Evaluation | Excellent | Fair | Excellent | Excellent | Fair | Excellent |

TABLE 21

|  |  |  | Comparative Example 1 | Comparative Example 2 | Comparative Example 3 | Comparative Example 4 | Comparative Example 5 | Comparative Example 6 |
|---|---|---|---|---|---|---|---|---|
|  | Lower layer resin | Material name | LR-21 | LR-22 | LR-23 | LR-24 | LR-25 | LR-26 |
|  | Upper layer resin | Material name | UR-1 | UR-1 | UR-1 | UR-1 | UR-1 | UR-1 |
|  | Bottom temperature (° C.) of polymer layer |  | 165 | 163 | 210 | 231 | 245 | 123 |
|  | Minimum storage modulus E' (×10$^8$ Pa) of polymer layer |  | 3.4 | 3.6 | 0.7 | 4.1 | 5.5 | 0.85 |
| Adhesion | Room temperature/ normal humidity | Result | 48/100 | 100/100 | 0/100 | 0/100 | 0/100 | 0/100 |
|  |  | Evaluation | Level B | Level C | Level A | Level A | Level A | Level A |
|  | High temperature/ high humidity | Result | 91/100 | 100/100 | 2/100 | 0/100 | 0/100 | 0/100 |
|  |  | Evaluation | Level d | Level e | Level b | Level a | Level a | Level a |
|  | Comprehensive evaluation |  | Poor | Bad | Good | Excellent | Excellent | Excellent |
| Rubbing resistance | High temperature/ high humidity | Change (%) in reflectance | 10 | 9 | 49 | 46 | 68 | 52 |
|  |  | Evaluation | Excellent | Excellent | Poor | Poor | Bad | Bad |

TABLE 22

|  |  |  | Comparative Example 7 | Comparative Example 8 | Comparative Example 9 | Comparative Example 10 | Comparative Example 11 | Comparative Example 12 |
|---|---|---|---|---|---|---|---|---|
|  | Lower layer resin | Material name | LR-27 | LR-28 | LR-29 | LR-30 | LR-31 | LR-32 |
|  | Upper layer resin | Material name | UR-1 | UR-1 | UR-1 | UR-1 | UR-1 | UR-1 |
|  | Bottom temperature (° C.) of polymer layer |  | 155 | 105 | 50 | 108 | 166 | 188 |
|  | Minimum storage modulus E' (×10$^8$ Pa) of polymer layer |  | 0.94 | 1 | 0.46 | 3.4 | 11 | 10.5 |

TABLE 22-continued

|  |  |  | Comparative Example 7 | Comparative Example 8 | Comparative Example 9 | Comparative Example 10 | Comparative Example 11 | Comparative Example 12 |
|---|---|---|---|---|---|---|---|---|
| Adhesion | Room temperature/ normal humidity | Result | 0/100 | 0/100 | 0/100 | 100/100 | 100/100 | 0/100 |
|  |  | Evaluation | Level A | Level A | Level A | Level C | Level C | Level A |
|  | High temperature/ high humidity | Result | 0/100 | 2/100 | 0/100 | 100/100 | 100/100 | 2/100 |
|  |  | Evaluation | Level a | Level b | Level a | Level e | Level e | Level b |
|  | Comprehensive evaluation |  | Excellent | Good | Excellent | Bad | Bad | Good |
| Rubbing resistance | High temperature/ high humidity | Change (%) in reflectance | 49 | 45 | 98 | 43 | 40 | 42 |
|  |  | Evaluation | Poor | Poor | Bad | Poor | Poor | Poor |

TABLE 23

|  |  | Comparative Example 13 | Comparative Example 14 | Comparative Example 15 | Comparative Example 16 | Comparative Example 17 | Comparative Example 18 |
|---|---|---|---|---|---|---|---|
| Lower layer resin | Material name | LR-33 | LR-34 | LR-5 | LR-35 | LR-36 | — |
| Upper layer resin | Material name | UR-1 | UR-1 | — | UR-12 | UR-12 | UR-12 |
| Bottom temperature (° C.) of polymer layer |  | 191 | 244 | 178 | 215 | 180 | 166 |
| Minimum storage modulus E' (×10$^8$ Pa) of polymer layer |  | 12.1 | 10.9 | 2.4 | 1.5 | 0.96 | 10.3 |
| Adhesion Room temperature/ normal humidity | Result | 0/100 | 0/100 | 0/100 | 0/100 | 0/100 | 100/100 |
|  | Evaluation | Level A | Level A | Level A | Level A | Level A | Level C |
| High temperature/ high humidity | Result | 4/100 | 0/100 | 55/100 | 35/100 | 88/100 | 100/100 |
|  | Evaluation | Level c | Level a | Level d | Level d | Level d | Level e |
| Comprehensive evaluation |  | Fair | Excellent | Poor | Poor | Poor | Poor |
| Rubbing resistance High temperature/ high humidity | Change (%) in reflectance | 62 | 40 | 46 | 38 | 35 | 40 |
|  | Evaluation | Bad | Poor | Poor | Poor | Poor | Poor |

As shown in Tables 16 to 20, all of Examples 1 to 30 exhibited high adhesion at room temperature and normal humidity and at high temperature and high humidity, and high rubbing resistance at high temperature and high humidity. In particular, the adhesion and the rubbing resistance were higher in Example 4, Example 6, Example 8, Example 13, Example 16, Example 19, Example 20, Example 23, and Example 24, and the adhesion and the rubbing resistance were particularly high in Example 1, Example 2, Example 3, Example 21, Example 22, Example 27, Example 28, and Example 30.

In comparison of Example 1, Example 2, Example 3, Example 4, Example 5, Example 6, and Example 7 in which the same monofunctional amide monomer (N,N-dimethylacrylamide) was used in the lower layer resin, the adhesion was comparable as a whole or increased (particularly, the adhesion at high temperature and high humidity) as the amide group concentration in the lower layer resin increased in the following order: Example 5 (1.61 mmol/g), Example 4 (2.11 mmol/g), Example 3 (2.61 mmol/g), Example 1 (3.02 mmol/g), Example 2 (3.92 mmol/g), Example 6 (4.42 mmol/g), and Example 7 (4.92 mmol/g). Meanwhile, the rubbing resistance was comparable or increased at high temperature and high humidity in the following order of decreasing amide group concentration in the lower layer resin: Example 7 (4.92 mmol/g), Example 6 (4.42 mmol/g), Example 2 (3.92 mmol/g), Example 1 (3.02 mmol/g), Example 3 (2.61 mmol/g), Example 4 (2.11 mmol/g), and Example 5 (1.61 mmol/g). These results show that the adhesion and the rubbing resistance at high temperature and high humidity can be increased, with the amide group concentration in the lower layer resin controlled at an optimal level. It was also found that in order to sufficiently increase the adhesion and the rubbing resistance at high temperature and high humidity, the lower layer resin preferably has an amide group concentration of 2 mmol/g or more and less than 4.5 mmol/g, more preferably 2.5 mmol/g or more and less than 4 mmol/g.

When the bottom temperature was 125° C. or higher and 195° C. or lower and the minimum storage modulus E' was 1.5×10$^8$ Pa or higher and 9×10$^8$ Pa or lower as in Example 6, Example 8, Example 14, Example 17, Example 19, and Example 20, the rubbing resistance at high temperature and high humidity was higher. Further, when the bottom temperature was 140° C. or higher and 180° C. or lower and the minimum storage modulus E' was 2×10$^8$ Pa or higher and 8×10$^8$ Pa or lower as in Example 1, Example 2, Example 3, Example 4, Example 5, Example 13, Example 16, Example 21, Example 22, Example 23, Example 24, Example 25, Example 27, Example 28, and Example 30, the rubbing resistance at high temperature and high humidity was especially high. These results show that the rubbing resistance at high temperature and high humidity can be increased, with the bottom temperature and the minimum storage modulus E' controlled at the respective optimal levels.

The results show that the adhesion and the rubbing resistance at high temperature and high humidity can be increased, with the amide group concentration in the lower layer resin, the bottom temperature, and the minimum storage modulus E' controlled at the respective optimal levels.

In comparison of Example 19, Example 20, Example 21, and Example 26 in which the same fluorine-containing compound was used in the upper layer resin, the rubbing resistance at high temperature and high humidity increased as the amount of the fluorine-containing compound in the upper layer resin increased in the following order: Example 26 (0 wt %), Example 19 (0.1 wt %), Example 20 (5 wt %), and Example 21 (10 wt %). This is because the amount of the fluorine atoms in the upper layer resin increases in the order of Example 26, Example 19, Example 20, and Example 21 and the smoothness of the surface of the polymer layer opposite to the substrate increases correspondingly. Meanwhile, in comparison of Example 22, Example 23, Example 24, and Example 25 in which the same fluorine-containing compound was used in the upper layer resin, the adhesion was comparable as a whole or increased (particularly, the adhesion at high temperature and high humidity) in the following order of decreasing amount of the fluorine-containing compound in the upper resin layer: Example 25 (32 wt %), Example 24 (30 wt %), Example 23 (25 wt %), and Example 22 (20 wt %). This is because the amount of the fluorine atoms in the upper layer resin decreases in the order of Example 25, Example 24, Example 23, and Example 22 and thus the fluorine atoms are efficiently distributed on the surface of the polymer layer opposite to the substrate without being highly distributed on the surface of the polymer layer adjacent to the substrate. In other words, the amount of the amide groups on the surface of the polymer layer adjacent to the substrate is greater in Example 22 than in Example 25. These results show that the adhesion and the rubbing resistance at high temperature and high humidity can be increased, with the amount of the fluorine-containing compound in the upper resin layer controlled at the optimal level. These results also show that in order to sufficiently increase the adhesion and the rubbing resistance at high temperature and high humidity, the amount of the fluorine-containing compound in the upper layer resin is preferably 0.1 wt % or more and 30 wt % or less, more preferably 5 wt % or more and 25 wt % or less, still more preferably 10 wt % or more and 20 wt % or less.

In contrast, as shown in Tables 21 to 23, in Comparative Examples 1 to 18, at least one of the adhesion and the rubbing resistance at high temperature and high humidity was low. In Comparative Example 1 and Comparative Example 2, the lower layer resin had an amide group concentration of less than 1.5 mmol/g, so that the adhesion at high temperature and high humidity was low. In Comparative Example 3, the lower layer resin had an amide group concentration of 5 mmol/g or more and the minimum storage modulus E' was lower than $1 \times 10^8$ Pa, so that the rubbing resistance at high temperature and high humidity was low. In Comparative Example 4 and Comparative Example 5, the bottom temperature was higher than 210° C., so that the rubbing resistance at high temperature and high humidity was low. In Comparative Example 6 and Comparative Example 7, the minimum storage modulus E' was lower than $1 \times 10^8$ Pa, so that the rubbing resistance at high temperature and high humidity was low. In Comparative Example 8, the bottom temperature was lower than 110° C., so that the rubbing resistance at high temperature and high humidity was low. In Comparative Example 9, the bottom temperature was lower than 110° C., and the minimum storage modulus E' was lower than $1 \times 10^8$ Pa, so that the rubbing resistance at high temperature and high humidity was low. In Comparative Example 10, the lower layer resin had an amide group concentration of less than 1.5 mmol/g and the bottom temperature was lower than 110° C., so that the adhesion and the rubbing resistance at high temperature and high humidity were low. In Comparative Example 11, the lower layer resin had an amide group concentration of less than 1.5 mmol/g and the minimum storage modulus E' of higher than $1 \times 10^9$ Pa, so that the adhesion and the rubbing resistance at high temperature and high humidity were low. In Comparative Example 12 and Comparative Example 13, the minimum storage modulus E' was higher than $1 \times 10^9$ Pa, so that the rubbing resistance at high temperature and high humidity was low. In Comparative Example 14, the bottom temperature was higher than 210° C. and the minimum storage modulus E' was higher than $1 \times 10^9$ Pa, so that the rubbing resistance at high temperature and high humidity was low. In Comparative Example 15, the polymer layer was formed from only the lower layer resin and had a low amide group concentration. In particular, since the amount of the amide group on the surface of the polymer layer adjacent to the substrate does not increase efficiently, the adhesion and the rubbing resistance at high temperature and high humidity were low. In Comparative Example 16 and Comparative Example 17, since the upper layer resin was applied after the lower layer resin was cured, the adhesion therebetween at high temperature and high humidity was low. In Comparative Example 18, since the polymer layer was formed from only the upper layer resin and did not contain amide groups, the adhesion was low.

ADDITIONAL REMARKS

According to one aspect, the present invention may provide a method for producing an optical member including a substrate and a polymer layer that is in direct contact with the substrate and that includes on a surface thereof an uneven structure provided with multiple projections at a pitch not longer than a wavelength of visible light, the method including: a step (1) of applying a lower layer resin and an upper layer resin; a step (2) of pressing a die against the lower layer resin and the upper layer resin from the upper layer resin side in a state where the lower layer resin and the upper layer resin applied are sequentially stacked from the substrate side, so as to form a resin layer including the uneven structure on a surface thereof; and a step (3) of curing the resin layer to form the polymer layer, wherein the lower layer resin contains an amide group, the lower layer resin has an amide group concentration of 1.5 mmol/g or more and less than 5 mmol/g, and the polymer layer has a minimum storage modulus E' of $1 \times 10^8$ Pa or higher and $1 \times 10^9$ Pa or lower at a bottom temperature of 110° C. or higher and 210° C. or lower in a dynamic viscoelasticity measurement with a measurement temperature range of −50° C. to 250° C., a temperature rise rate of 5° C./rain, and a frequency of 10 Hz.

The phrase "applying a lower layer resin and an upper layer resin" in the step (1) encompasses not only cases where the lower layer resin and the upper layer resin are overlaid on and applied to the same member but also cases where the lower layer resin and the upper layer resin are applied to different members. Examples of cases where the lower layer resin and the upper layer resin are applied to different members may include a case where the lower layer resin is applied to the substrate and the upper layer resin is applied to the die.

The phrase "pressing a die against the lower layer resin and the upper layer resin from the upper layer resin side in a state where the lower layer resin and the upper layer resin applied are sequentially stacked from the substrate side" in the step (2) encompasses not only cases where the die is pressed against after the lower layer resin and the upper layer resin are sequentially stacked from the substrate side, but also cases where the die is pressed against while the lower layer resin and the upper layer resin are sequentially stacked from the substrate side. In other words, the present invention encompasses a method in which the lower layer resin and the upper layer resin are sequentially stacked from the substrate side (hereinafter also referred to as stacking step) and the die is pressed against the lower layer resin and the upper layer resin from the upper layer resin side (hereinafter also referred to as pressing step), at the same time or different times in the step (2).

The following Method 1 is preferred as a method in which the stacking step and the pressing step are performed at the same time.

(Method 1) The lower layer resin is applied to the substrate, and the upper layer resin is applied to the die. Subsequently, the die to which the upper layer resin is applied is pressed against the lower layer resin applied to the substrate from the upper layer resin side (the pressing step). While doing so, the upper layer resin is stacked on the lower layer resin (the stacking step).

In other words, the step (1) may include applying the lower layer resin to the substrate and applying the upper layer resin to the die; and the step (2) may include pressing the die to which the upper layer resin is applied against the lower layer resin applied to the substrate from the upper layer resin side. In this case, the uneven structure can be formed while the upper layer resin is stacked on the lower layer resin. In addition, the number of steps can be decreased compared to when the lower layer resin and the upper layer resin are sequentially applied to the substrate (Method 2 described later). This method can also favorably increase antifouling properties, and particularly, it can minimize the material loss of the upper layer resin.

Any one of the following Methods 2 to 5 is preferred as the method in which the stacking step and pressing step are performed at different times.

(Method 2) The lower layer resin and the upper layer resin are sequentially applied to the substrate (the stacking step). Subsequently, the die is pressed against the lower layer resin and the upper layer resin from the upper layer resin side (the pressing step).

In other words, the step (1) may include sequentially applying the lower layer resin and the upper layer resin to the substrate. In this case, the lower layer resin and the upper layer resin can be efficiently applied together with devices for common application methods (such as gravure coating or slot-die coating).

(Method 3) The lower layer resin and the upper layer resin are simultaneously applied to the substrate (the upper layer resin is formed on the lower layer resin, on the side opposite to the substrate) (the stacking step). Subsequently, the die is pressed against the lower layer resin and the upper layer resin from the upper layer resin side (the pressing step).

In other words, the step (1) may include simultaneously applying the lower layer resin and the upper layer resin to the substrate. In this case, the lower layer resin and the upper layer resin can be efficiently applied. Further, the productivity can be increased because the application device can be simplified and the number of steps can be reduced compared to when the lower layer resin and the upper layer resin are sequentially applied to the substrate (Method 2 described above).

(Method 4) The upper layer resin and the lower layer resin are sequentially applied to the die (the stacking step). Subsequently, the die to which the upper layer resin and the lower layer resin are applied is pressed against the substrate (the pressing step).

In other words, the step (1) may include sequentially applying the upper layer resin and the lower layer resin to the die. In this case, if the die is a flexible die, the uneven structure can be easily formed regardless of the shape of the substrate.

(Method 5) The upper layer resin and the lower layer resin are simultaneously applied to the die (the lower layer resin is formed on the upper layer resin, on the side opposite to the die) (the stacking step). Subsequently, the die to which the upper layer resin and the lower layer resin are applied is pressed against the substrate (the pressing step).

In other words, the step (1) may include simultaneously applying the upper layer resin and the lower layer resin to the die. In this case, for example, if the die is a flexible die, the uneven structure can be easily formed regardless of the shape of the substrate.

Examples of other preferred features of the method for producing an optical member of the present invention are mentioned below. The examples may appropriately be combined with each other within the spirit of the present invention.

The lower layer resin may have an amide group concentration of 2 mmol/g or more and less than 4.5 mmol/g, which can further increase the adhesion between the substrate and the polymer layer and the rubbing resistance at high temperature and high humidity.

The lower layer resin may have an amide group concentration of 2.5 mmol/g or more and less than 4 mmol/g, which can still further increase the adhesion between the substrate and the polymer layer and the rubbing resistance at high temperature and high humidity.

The bottom temperature may be 125° C. or higher and 195° C. or lower and the minimum storage modulus E' may be $1.5 \times 10^8$ Pa or higher and $9 \times 10^8$ Pa or lower, which can further increase the rubbing resistance at high temperature and high humidity.

The bottom temperature may be 140° C. or higher and 180° C. or lower and the minimum storage modulus E' may be $2 \times 10^8$ Pa or higher and $8 \times 10^8$ Pa or lower, which can still further increase the rubbing resistance at high temperature and high humidity.

The lower layer resin may contain a monofunctional amide monomer, and the amount of the monofunctional amide monomer in the lower layer resin may be 15 wt % or more and 49 wt % or less, which can further increase the adhesion between the substrate and the polymer layer and the rubbing resistance at high temperature and high humidity.

The monofunctional amide monomer may contain at least one of N,N-dimethylacrylamide and N,N-diethylacrylamide, which can favorably increase the adhesion between the substrate and the polymer layer and the rubbing resistance at high temperature and high humidity, even when the amount of the monofunctional amide monomer is small.

The upper layer resin may contain a fluorine-containing compound, and the amount of the fluorine-containing compound in the upper layer resin may be 0.1 wt % or more and 30 wt % or less, which can increase the smoothness of the surface of the polymer layer opposite to the substrate, resulting high rubbing resistance at high temperature and high humidity. In addition, since the hygroscopicity of the polymer layer decreases, the adhesion between the substrate and the polymer layer can be prevented from decreasing particularly at high temperature and high humidity.

The amount of the fluorine-containing compound in the upper layer resin may be 5 wt % or more and 25 wt % or less, which can further increase the rubbing resistance at high temperature and high humidity. In addition, the adhesion between the substrate and the polymer layer can be further prevented from decreasing at high temperature and high humidity.

The amount of the fluorine-containing compound in the upper layer resin may be 10 wt % or more and 20 wt % or less, which can still further increase the rubbing resistance at high temperature and high humidity. In addition, the adhesion between the substrate and the polymer layer can be still further prevented from decreasing at high temperature and high humidity.

At least one of the lower layer resin and the upper layer resin may be of solvent-free, which can reduce the cost relating to the use of a solvent and environmental load. Further, the need for a device for drying and removing a solvent is eliminated, and the equipment cost can thus be reduced.

The substrate may contain triacetyl cellulose at least on a surface thereof adjacent to the polymer layer, which can increase the adhesion between the substrate and the polymer layer at high temperature and high humidity, even when the substrate contains highly polar triacetyl cellulose at least on the surface thereof adjacent to the polymer layer.

According to another aspect, the present invention may provide an optical member including: a substrate; and a polymer layer that is in direct contact with the substrate and that includes on a surface thereof an uneven structure provided with multiple projections at a pitch not longer than a wavelength of visible light, wherein the polymer layer is a cured product of a resin layer that includes the uneven structure on a surface thereof and that is formed by pressing a die against a lower layer resin having an amide group concentration of 1.5 mmol/g or more and less than 5 mmol/g and an upper layer resin from the upper layer resin side in a state where the lower layer resin and the upper layer resin are sequentially stacked from the substrate side, and the polymer layer has a minimum storage modulus E' of $1\times10^8$ Pa or higher and $1\times10^9$ Pa or lower at a bottom temperature of 110° C. or higher and 210° or lower in a dynamic viscoelasticity measurement with a measurement temperature range of −50° C. to 250° C., a temperature rise rate of 5° C./min, and a frequency of 10 Hz.

The expression "a cured product of a resin layer that includes the uneven structure on a surface thereof and that is formed by pressing a die against a lower layer resin . . . and an upper layer resin from the upper layer resin side in a state where the lower layer resin and the upper layer resin are sequentially stacked from the substrate side" encompasses not only a cured product of a resin layer that includes the uneven structure on a surface thereof and that is formed by sequentially stacking the lower layer resin and the upper layer resin from the substrate side and subsequently pressing the die against the lower layer resin and the upper layer resin, but also a cured product of a resin layer that includes the uneven structure on a surface thereof and that is formed by pressing the die against the lower layer resin and the upper layer resin while sequentially stacking the lower layer resin and the upper layer resin from the substrate side. In other words, the above expression encompasses a cured product of a resin layer that includes the uneven structure on a surface thereof and that is formed by sequentially stacking the lower layer resin and the upper layer resin from the substrate side (the stacking step) and pressing the die against the lower layer resin and the upper layer resin from the upper layer resin side (the pressing step) at the same time or different times.

The following cured product 1 is preferred as the cured product of a resin layer that includes the uneven structure on a surface thereof and that is formed by performing the stacking step and the pressing step at the same time.

(Cured product 1) A cured product of a resin layer that includes the uneven structure on a surface thereof and that is formed by as follows: disposing the lower layer resin on the substrate; disposing the upper layer resin on the die; and subsequently, while pressing the die on which the upper layer resin is disposed against the lower layer resin disposed on the substrate from the upper layer resin side (the pressing step), stacking the upper layer resin on the lower layer resin (the stacking step).

Any one of the following cured products 2 to 5 is preferred as the cured product of a resin layer that includes the uneven structure on a surface thereof that is formed by performing the stacking step and the pressing step at different times.

(Cured product 2) A cured product of a resin layer that includes the uneven structure on a surface thereof and that is formed as follows: sequentially disposing the lower layer resin and the upper layer resin on the substrate (the stacking step); and subsequently, pressing the die against the lower layer resin and the upper layer resin from the upper layer resin side (the pressing step).

(Cured product 3) A cured product of a resin layer that includes the uneven structure on a surface thereof and that is formed as follows: simultaneously disposing the lower layer resin and the upper layer resin on the substrate (the upper layer resin is disposed on the lower layer resin, on the side opposite to the substrate) (the stacking step); and subsequently, pressing the die against the lower layer resin and the upper layer resin from the upper layer resin side (the pressing step).

(Cured product 4) A cured product of a resin layer that includes the uneven structure on a surface thereof and that is formed as follows: sequentially disposing the upper layer resin and the lower layer resin on the die (the stacking step); and subsequently, pressing the die on which the upper layer resin and the lower layer resin are disposed against the substrate (the pressing step).

(Cured product 5) A cured product of a resin layer that includes the uneven structure on a surface thereof and that is formed as follows: simultaneously disposing the upper layer resin and the lower layer resin on the die (the lower layer resin is disposed on the upper layer resin, on the side opposite to the die) (the stacking step); and subsequently, pressing the die on which the upper layer resin and the lower layer resin are disposed against the substrate (the pressing step).

Examples of other preferred features of the optical member of the present invention include those related to the features of the optical members mentioned in the examples of preferred features of the method for producing an optical member of the present invention.

REFERENCE SIGNS LIST 1, 101a, 101b, 101c: optical member
2, 102: substrate
3, 103a, 103b: polymer layer
4, 104a, 104b, 104c: projection
5a, 105a: lower layer resin
5b, 105b: upper layer resin
6, 106: die
7: resin layer
P, Q1, Q2, Q3: pitch
D: polymer layer thickness
Da, Ea: lower layer resin thickness
Db, Eb: upper layer resin thickness

The invention claimed is:

1. A method for producing an optical member including a substrate and a polymer layer that is in direct contact with the substrate and that includes on a surface thereof an uneven structure provided with multiple projections at a pitch not longer than a wavelength of visible light, the method comprising:
 a step (1) of applying a lower layer resin onto the substrate and applying an upper layer resin onto the substrate or a die;
 a step (2) of pressing the die against the lower layer resin and the upper layer resin from the upper layer resin side in a state where the lower layer resin and the upper layer resin applied are sequentially stacked from the substrate side, so as to form a resin layer including the uneven structure on a surface thereof; and
 a step (3) of curing the resin layer, in which the lower layer resin and the upper layer resin are integrated, to form the polymer layer,
 wherein the lower layer resin contains a monofunctional amide monomer having an amide group, and a polyfunctional acrylate,
 the monofunctional amide monomer contains at least one of N,N-dimethylacrylamide and N,N-diethylacrylamide,
 the lower layer resin has an amide group concentration of 1.5 mmol/g or more and less than 5 mmol/g, and
 the polymer layer has a minimum storage modulus E' of $1\times10^8$ Pa or higher and $1\times10^9$ Pa or lower at a bottom temperature of 110° C. or higher and 210° C. or lower in a dynamic viscoelasticity measurement with a measurement temperature range of −50° C. to 250° C., a temperature rise rate of 5° C./min, and a frequency of 10 Hz.

2. The method for producing an optical member according to claim 1,
 wherein the lower layer resin has an amide group concentration of 2 mmol/g or more and less than 4.5 mmol/g.

3. The method for producing an optical member according to claim 2,
 wherein the lower layer resin has an amide group concentration of 2.5 mmol/g or more and less than 4 mmol/g.

4. The method for producing an optical member according to claim 1,
 wherein the bottom temperature is 125° C. or higher and 195° C. or lower and the minimum storage modulus E' is $1.5\times10^8$ Pa or higher and $9\times10^8$ Pa or lower.

5. The method for producing an optical member according to claim 4,
 wherein the bottom temperature is 140° C. or higher and 180° C. or lower and the minimum storage modulus E' is $2\times10^8$ Pa or higher and $8\times10^8$ Pa or lower.

6. The method for producing an optical member according to claim 1,
 wherein the amount of the monofunctional amide monomer in the lower layer resin is 15 wt % or more and 49 wt % or less.

7. The method for producing an optical member according to claim 1,
 wherein the upper layer resin contains a fluorine-containing compound, and
 the amount of the fluorine-containing compound in the upper layer resin is 0.1 wt % or more and 30 wt % or less.

8. The method for producing an optical member according to claim 7,
 wherein the amount of the fluorine-containing compound in the upper layer resin is 5 wt % or more and 25 wt % or less.

9. The method for producing an optical member according to claim 8,
 wherein the amount of the fluorine-containing compound in the upper layer resin is 10 wt % or more and 20 wt % or less.

10. The method for producing an optical member according to claim 1,
 wherein at least one of the lower layer resin and the upper layer resin is of solvent-free.

11. The method for producing an optical member according to claim 1,
 wherein the substrate contains triacetyl cellulose at least on a surface thereof adjacent to the polymer layer.

12. The method for producing an optical member according to claim 1,
 wherein the step (1) includes applying the lower layer resin to the substrate and applying the upper layer resin to the die, and
 the step (2) includes pressing the die to which the upper layer resin is applied against the lower layer resin applied to the substrate from the upper layer resin side.

13. The method for producing an optical member according to claim 1,
 wherein the step (1) includes sequentially applying the lower layer resin and the upper layer resin to the substrate.

14. The method for producing an optical member according to claim 1,
 wherein the step (1) includes simultaneously applying the lower layer resin and the upper layer resin to the substrate.

15. The method for producing an optical member according to claim 1,
 wherein the polyfunctional acrylate is an acrylate of three or more functionalities.

16. The method for producing an optical member according to claim 1,
 wherein the amount of the polyfunctional acrylate in the lower layer resin is 51/100.5 wt % or more and 84/100.5 wt % or less.

17. The method for producing an optical member according to claim 1,
 wherein the polyfunctional acrylate is an acrylate of three or more functionalities, and the amount of the polyfunctional acrylate in the lower layer resin is 51/100.5 wt % or more and 84/100.5 wt % or less.

* * * * *